US012289433B2

United States Patent
Lukas

(10) Patent No.: US 12,289,433 B2
(45) Date of Patent: Apr. 29, 2025

(54) SYSTEMS AND METHODS FOR DEVICE INTEROPERABILITY FOR EXTENDED REALITY

(71) Applicant: QUALCOMM Incorporated, San Diego, CA (US)

(72) Inventor: Steve Lukas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/724,408

(22) Filed: Apr. 19, 2022

(65) Prior Publication Data

US 2023/0137141 A1     May 4, 2023

Related U.S. Application Data

(60) Provisional application No. 63/263,429, filed on Nov. 2, 2021.

(51) Int. Cl.
| | |
|---|---|
| *H04N 13/117* | (2018.01) |
| *G02B 27/01* | (2006.01) |
| *H04M 1/72412* | (2021.01) |

(52) U.S. Cl.
CPC ......... *H04N 13/117* (2018.05); *G02B 27/017* (2013.01); *G02B 27/0179* (2013.01); *H04M 1/72412* (2021.01); *G02B 2027/0141* (2013.01)

(58) Field of Classification Search
CPC ...... G06F 3/011; G06F 3/04815; G06F 3/012; G06F 3/017; G06F 3/0346; G06F 3/013; G06F 3/0484; G06F 3/0489; G06F 3/147
USPC .......................................................... 348/47
See application file for complete search history.

(56) References Cited

U.S. PATENT DOCUMENTS

| | | | |
|---|---|---|---|
| 2015/0340010 A1 | 11/2015 | Travers et al. | |
| 2017/0308258 A1* | 10/2017 | Xu | G06F 13/14 |
| 2022/0124143 A1* | 4/2022 | Rafkind | H04W 4/02 |

FOREIGN PATENT DOCUMENTS

| | | | | |
|---|---|---|---|---|
| WO | WO-2015125364 A1 * | 8/2015 | | G06F 3/011 |

OTHER PUBLICATIONS

International Search Report and Written Opinion—PCT/US2022/078027—ISA/EPO—Feb. 1, 2023.

(Continued)

*Primary Examiner* — Masum Billah
(74) *Attorney, Agent, or Firm* — QUALCOMM Incorporated

(57) ABSTRACT

Systems and techniques are described for device interoperability for extended reality (XR). An apparatus, such as a mobile handset, runs a software application and uses the software application to generate first content to be displayed using a first display of the apparatus. The apparatus causes the first content to be displayed using the first display of the apparatus. The apparatus uses the software application to generate second content that is based on the first content, that is distinct from the first content, and that is to be displayed using a second display of a head-mounted apparatus. The apparatus causes the second content to be displayed using the second display of the head-mounted apparatus at least in part by sending the second content to the head-mounted apparatus. In some cases, the apparatus and the head-mounted apparatus are both associated with the same user, and are of different device types.

30 Claims, 13 Drawing Sheets

(56) References Cited

OTHER PUBLICATIONS

Langner R., et al., "MARVIS: Combining Mobile Devices and Augmented Reality for Visual Data Analysis", Proceedings of the 36th Annual ACM Symposium on Applied Computing, ACMPUB27, New York, Ny, USA, May 6, 2021, pp. 1-17, XP058739954, DOI: 10.1145/3411764.3445593, ISBN: 978-1-4503-8128-4, Abstract, Sections 1, 4, 4.1, 5, 5.1, 5.2, Figures 1-7.
Normand E., et al., "Enlarging a Smartphone with AR to Create a Handheld VESAD (Virtually Extended Screen-Aligned Display)", IEEE International Symposium on Mixed and Augmented Reality ISMAR), Oct. 16, 2018, pp. 123-133, XP033502091, DOI: 10.1109/ISMAR.2018.00043, Abstract, Sections—1, 3, 4, Figures 1-6.
Zhu F., et al., "BISHARE: Exploring Bidirectional Interactions Between Smartphones and Head-Mounted Augmented Reality", Proceedings of the 29th ACM International Conference on Information & Knowledge Management, ACMPUB27, New York, Ny, Usa, Apr. 21, 2020, pp. 1-14, XP058712620, DOI: 10.1145/3313831.3376233, ISBN: 978-1-4503-6859-9, Abstract, Figures 1, 3, 4, 8, 11, 12.

\* cited by examiner

SYSTEMS AND METHODS FOR DEVICE INTEROPERABILITY FOR EXTENDED REALITY

CROSS-REFERENCE TO RELATED APPLICATIONS

This application claims the benefit of U.S. Provisional Application No. 63/263,429, filed Nov. 2, 2021 and titled "Systems and Methods for Extended Reality Device Interoperability," which is hereby incorporated by reference in its entirety and for all purposes.

FIELD

This application is related to interoperability between devices in extended reality (XR) systems. More specifically, this application relates to systems and methods of using an apparatus to generate first content to be displayed using a display of the apparatus and to generate and send second content to be displayed using a second display of a head-mounted apparatus.

BACKGROUND

An extended reality (XR) device is a device that displays an environment to a user, for example through a head-mounted display (HMD) or mobile handset. The environment is at least partially different from the real-world environment in which the user is in. The user can generally change their view of the environment interactively, for example by tilting or moving the HMD or other device. Virtual reality (VR) and augmented reality (AR) are examples of XR. In some examples, a device that interacts with or augments an XR device, such as a controller or another apparatus, can also be referred to as an XR device.

BRIEF SUMMARY

In some examples, systems and techniques are described for device interoperability for extended reality (XR) between an apparatus (e.g., a mobile handset, a wearable device, and/or an XR device) and a head-mounted apparatus (e.g., a head-mounted display, a pair of smart glasses, and/or an XR device). The apparatus runs a software application. The apparatus uses the software application to generate first content to be displayed using a first display of the apparatus. The apparatus causes the first content to be displayed using the first display of the apparatus. The apparatus uses the software application to generate second content that is based on the first content, and that is distinct from the first content. The second content is configured to be displayed using a second display of the head-mounted apparatus. The apparatus causes the second content to be displayed using a second display of a head-mounted apparatus at least in part by sending the second content to the head-mounted apparatus. In some examples, the apparatus and the head-mounted apparatus are of different device types. For instance, in an illustrative example, the apparatus is a mobile handset and the head-mounted apparatus is a head-mounted display. In some examples, the first display of the apparatus and the second display of the head-mounted apparatus are of different display types. For instance, in an illustrative example, the second display of the head-mounted apparatus is a light-transmissive display that allows light from the environment to pass through the second display, whereas the first display of the apparatus is not light-transmissive. In some examples, the apparatus and the head-mounted apparatus are both associated with the same user. For instance, the apparatus and the head-mounted apparatus can both be in use by the same user during a time period during which the first content and the second content are generated and/or displayed using their respective displays of their respective devices.

According to at least one example, an apparatus is provided that includes a memory (e.g., configured to store data, such as virtual content data, one or more images, etc.) and one or more processors (e.g., implemented in circuitry) coupled to the memory. The one or more processors are configured to and can: generate, using a software application, first content to be displayed using a first display of the apparatus; cause the first content to be displayed using the first display of the apparatus; generate, using the software application, second content based on the first content, wherein the second content is distinct from the first content; and cause the second content to be displayed using a second display of a head-mounted apparatus at least in part by sending the second content to the head-mounted apparatus.

In another example, a method is provided for device interoperability for extended reality (XR). The method includes: generating, using a software application of an apparatus, first content to be displayed using a first display of the apparatus; causing the first content to be displayed using the first display of the apparatus; generating, using the software application of the first XR system, second content based on the first content, wherein the second content is distinct from the first content; and causing the second content to be displayed using a second display of the head-mounted apparatus at least in part by sending the second content from the apparatus to the head-mounted apparatus.

In another example, a non-transitory computer-readable medium of an apparatus is provided that has stored thereon instructions that, when executed by one or more processors of the apparatus, cause the one or more processors to: generate, using a software application of the apparatus, first content to be displayed using a first display; cause the first content to be displayed using the first display of the apparatus; generate, using the software application of the apparatus, second content based on the first content, wherein the second content is distinct from the first content; and cause the second content to be displayed using a second display of a head-mounted apparatus at least in part by sending the second content from the apparatus to the head-mounted apparatus.

In another example, an apparatus for device interoperability for extended reality (XR) is provided. The apparatus includes: means for generating, using a software application of an apparatus, first content to be displayed using a first display of the apparatus; means for causing the first content to be displayed using the first display of the apparatus; means for generating, using the software application of the apparatus, second content based on the first content, wherein the second content is distinct from the first content; and means for causing the second content to be displayed by a second display of a head-mounted apparatus at least in part by sending the second content from the apparatus to the head-mounted apparatus.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
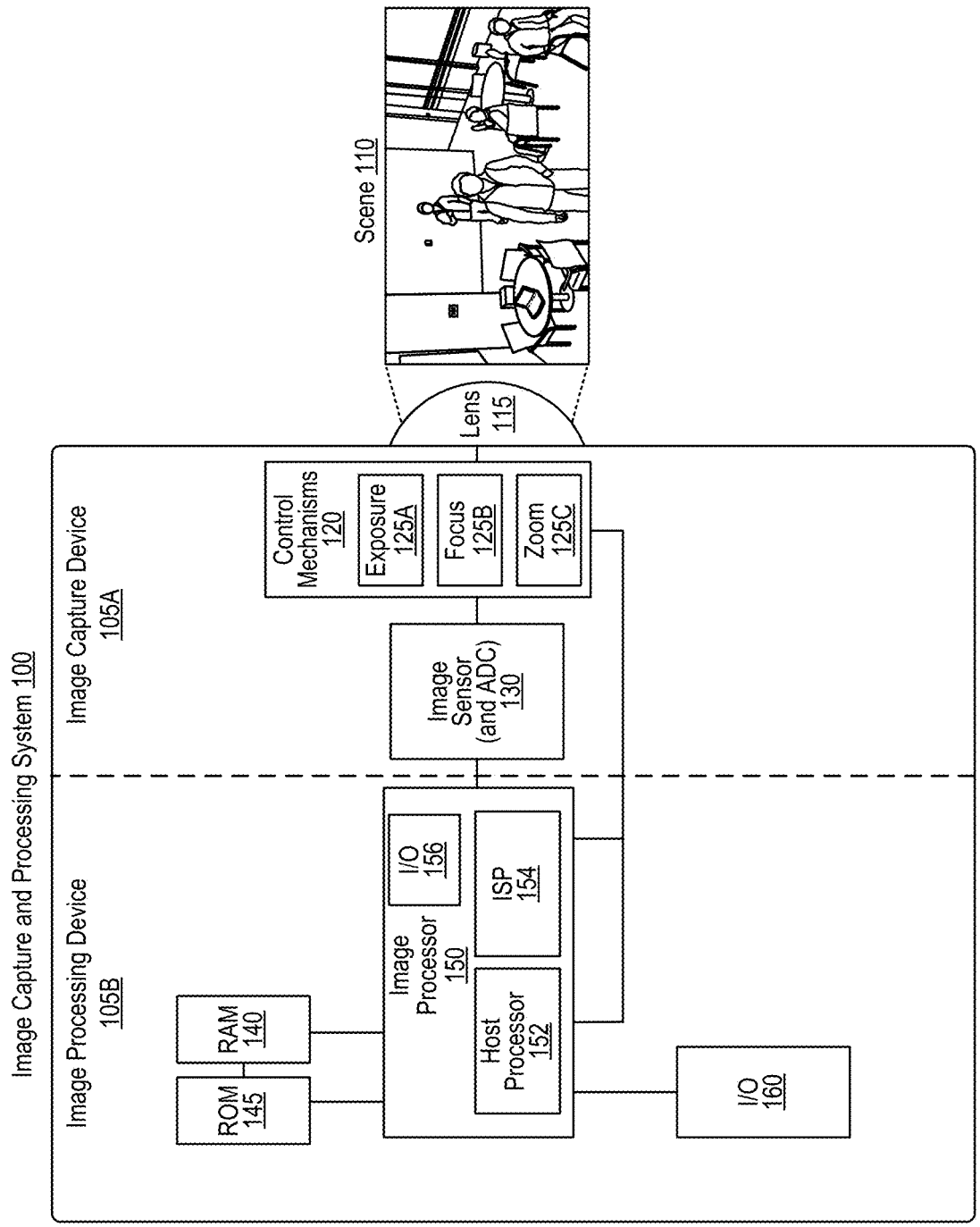
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

An extended reality (XR) device is a device that displays an environment to a user, for example through a head-mounted display (HMD) or mobile handset. The environment is at least partially different from the real-world environment in which the user is in. The user can generally change their view of the environment interactively, for example by tilting or moving the HMD or other device. Virtual reality (VR) and augmented reality (AR) are examples of XR. A device that interacts with or augments an XR device, such as a controller, can also be referred to as an XR device.

In some examples, systems and techniques are described for device interoperability for extended reality (XR) between an apparatus (e.g., a mobile handset, a wearable device, and/or an XR device) and a head-mounted apparatus (e.g., a head-mounted display, a pair of smart glasses, and/or an XR device). The apparatus runs a software application, such as a video game, a media viewer, an illustration tool, a media editor, a browser, an interactive environment, a communication platform, or a combination thereof. The apparatus uses the software application to generate first content to be displayed using a first display of the apparatus. The apparatus causes the first content to be displayed using the first display of the apparatus. The apparatus uses the software application to generate second content that is based on the first content, that is distinct from the first content, and that is to be displayed using a second display of the head-mounted apparatus. The apparatus causes the second content to be displayed by a second display of the head-mounted apparatus at least in part by sending the second content to the head-mounted apparatus. In some examples, the apparatus and the head-mounted apparatus are of different device types. For instance, in an illustrative example, the apparatus is a mobile handset and the head-mounted apparatus is a head-mounted display. In some examples, the first display of the apparatus and the second display of the head-mounted apparatus are of different display types. For instance, in an illustrative example, the second display of the head-mounted apparatus is a light-transmissive display that allows light from the environment to pass through the second display, whereas the first display of the apparatus is not light-transmissive. In some examples, the apparatus and the head-mounted apparatus are both associated with the same user. For instance, the apparatus and the head-mounted apparatus can both be in use by the same user during a time period during which the first content and the second content are generated and/or displayed using their respective displays of their respective devices.

The systems and techniques for device interoperability for XR described herein provide numerous technical advantages and benefits over traditional XR technologies and display technologies. For instance, the systems and techniques for XR device interoperability described herein, by generating the second content at the apparatus rather than at the head-mounted apparatus, can extend the battery life of the head-mounted apparatus, reduce the computational load on the processor of the head-mounted apparatus, reduce heat generated by the head-mounted apparatus, and/or reduce the need for heat dissipation components in the head-mounted apparatus. Additionally, the systems and techniques for device interoperability for XR described herein, by generating both the first content and the second content at the apparatus rather than at the head-mounted apparatus, can ensure that representation(s) of element(s) (e.g., shared elements or other elements) in the first content and the second content match, coordinate, and/or are synchronized (e.g., temporally synchronized). Any inputs received at the apparatus (e.g., through a touchscreen or buttons or other input interfaces of the apparatus) can immediately produce effects on both the first content and the second content at the same time, without any lag resulting from the inputs having to be transferred from the apparatus to the head-mounted apparatus, making the device interoperability more responsive. Further, the systems and techniques for device interoperability for XR described herein, by generating both the first content and the second content at the apparatus rather than at the head-mounted apparatus, can improve security by limiting access to sensitive information used as a basis for generating the first content and the second content (e.g., credit card numbers, biometric data) to be accessible only the apparatus (e.g., to not be accessible by the head-mounted apparatus), and by limiting or eliminating a need to transmit such sensitive information over a potentially vulnerable wired or wireless connection. Thus, the systems and techniques for device interoperability for XR described herein are more efficient, more accurate, more synchronized, more responsive, and more secure than traditional XR technologies and traditional display technologies.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1310 discussed with respect to the computing system 1300. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetoothm, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1320, read-only memory (ROM) 145 and/or 1325, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1335, any other input devices 1345, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
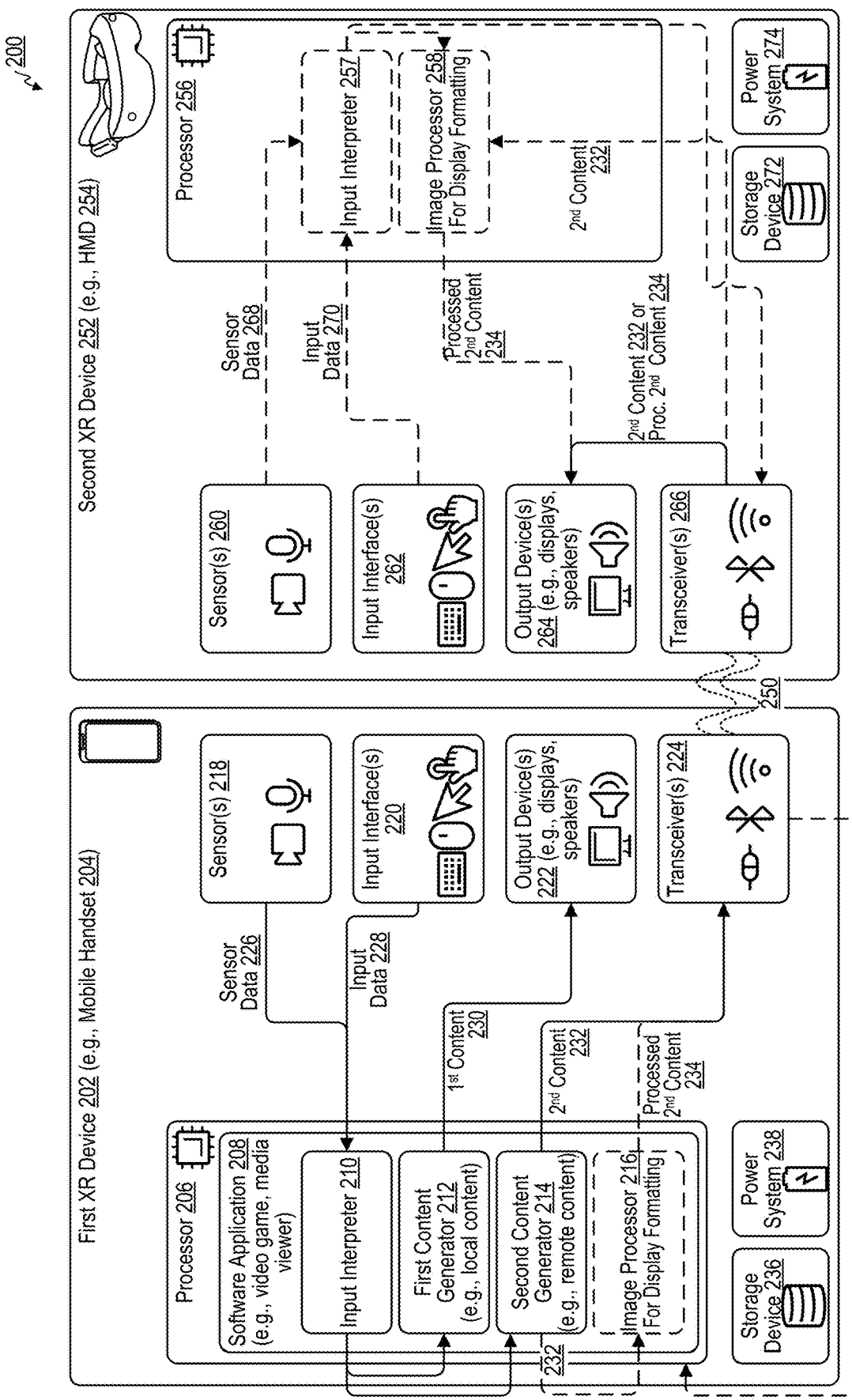
FIG. 2 is a block diagram illustrating an example architecture of an extended reality (XR) system with an apparatus communicatively coupled to, and generating content for, a head-mounted apparatus, in accordance with some examples.

FIG. 2 is a block diagram illustrating an example architecture of an extended reality (XR) system 200 with a apparatus 202 communicatively coupled to, and generating content for, a head-mounted apparatus 252. The XR system 200 includes the apparatus 202 and the head-mounted apparatus 252. The apparatus 202 can include at least portion(s) of one or more computing systems 1300. The head-mounted apparatus 252 can include at least portion(s) of one or more computing systems 1300. In an illustrative example (as illustrated in FIG. 2), the apparatus 202 is a mobile handset (e.g., mobile handset 410) and the head-mounted apparatus 252 is a head-mounted display (TIMID) (e.g., HMD 310). In a second example, the apparatus 202 is a HMD (e.g., HMD 310) and the head-mounted apparatus 252 is a mobile handset (e.g., mobile handset 410). In a third example, the apparatus 202 is a mobile handset (e.g., mobile handset 410) and the head-mounted apparatus 252 is a second mobile handset (e.g., mobile handset 410). In a fourth example, the apparatus 202 is a HMD (e.g., HMD 310) and the head-mounted apparatus 252 is a second HMD (e.g., HMD 310). The terms head-mounted apparatus and head-mounted device as used herein may be used to refer to glasses, contact lenses, monocles, goggles, helmets, headbands, and/or any other form of headwear that can include display(s) and/or other elements illustrated and/or discussed herein with respect to the apparatus 202, the head-mounted apparatus 252, the mobile handset 204, the HMD 254, the HMD 310, the mobile handset 410, the apparatus 510, the head-mounted apparatus 520, the apparatus 1105, the head-mounted apparatus 1110, the computing system 1300, or a combination thereof.

The apparatus 202 includes a processor 206. The processor 206 can be an example of the processor 1310 of the computing system 1300. The apparatus 202 includes a storage device 236. The storage device 236 can be an example of the cache 1312, the memory 1315, the ROM 1320, the RAM 1325, the storage device 1330, a non-transitory computer-readable storage medium, or a combination thereof. The head-mounted apparatus 252 includes a processor 256. The processor 256 can be an example of the processor 1310 of the computing system 1300. The head-mounted apparatus 252 includes a storage device 272. The storage device 272 can be an example of the cache 1312, the memory 1315, the ROM 1320, the RAM 1325, the storage device 1330, a non-transitory computer-readable storage medium, or a combination thereof.

The processor 206 of the apparatus 202 can execute instructions stored in the storage device 236 to run a software application 208. Some examples of the software application 208 can include a browser, a recipe app (e.g., recipe app 540), a media asset viewer app (e.g., media asset viewer app 640), a illustration tool (e.g., illustration tool 840), a video game (e.g., video game 940, video game 1040), another type of software application described herein, or a combination thereof. The software application 208, and/or other software running using the processor 206, can include an input interpreter 210, a first content generator 212, a second content generator 214, and/or an image processor 216 for display formatting. The processor 256 of the head-mounted apparatus 252 can execute instructions stored in the storage device 272 to run one or more software applications, which may include an input interpreter 257 and/or an image processor 258 for display formatting.

The apparatus 202 includes one or more sensors 218. The head-mounted apparatus 252 includes one or more sensors 260. The sensor(s) 218 and/or the sensor(s) 260 can each include one or more cameras, one or more image sensors, one or more microphones, one or more heart rate monitors, one or more oximeters, one or more biometric sensors, one or more positioning receivers, one or more Global Navigation Satellite System (GNSS) receivers, one or more Inertial Measurement Units (IMUs), one or more accelerometers, one or more gyroscopes, one or more barometers, one or more thermometers, one or more altimeters, one or more depth sensors, one or more light detection and ranging (LIDAR) sensors, one or more radio detection and ranging (RADAR) sensors, one or more sound detection and ranging (SODAR) sensors, one or more sound navigation and ranging (SONAR) sensors, one or more time of flight (ToF) sensors, one or more structured light sensors, one or more input device(s) 1345, one or more other sensors discussed herein, or a combination thereof. The sensor(s) 218 of the apparatus 202 can capture sensor data 226 and send the sensor data 226 to the input interpreter 210 of the apparatus 202. The sensor(s) 260 of the head-mounted apparatus 252 can capture sensor data 268 and send the sensor data 268 to the input interpreter 257 of the head-mounted apparatus 252.

The apparatus 202 includes one or more input interfaces 220. The head-mounted apparatus 252 includes one or more input interfaces 262. The input interface(s) 220 and/or the input interface(s) 262 can each include one or more touch-sensitive surfaces (e.g., of a touchscreen and/or trackpad), one or more buttons (e.g., physical buttons or virtual buttons on a touchscreen), one or more mice, one or more keyboards, one or more keypads, one or more microphones, one or more input device(s) 1345, or a combination thereof. The input interface(s) 220 of the apparatus 202 can capture input data 228 and send the input data 228 to the input interpreter 210 of the apparatus 202. The input interface(s) 262 of the head-mounted apparatus 252 can capture input data 270 and send the input data 270 to the input interpreter 257 of the head-mounted apparatus 252.

The input interpreter 210 of the apparatus 202 can parse, interpret, convert, reformat, and/or detect elements within the sensor data 226 and/or the input data 228. The input interpreter 210 may generate input information based on the sensor data 226 and/or the input data 228, and may output the input information to other elements of the software application 208, for instance to the first content generator 212, the second content generator 214, and/or to the image processor 216 for display formatting. The input information may identify various detections, identifications, and/or determinations made by the input interpreter 210 based on the sensor data 226 and/or the input data 228. For example, the input interpreter 210 can detect representation(s) of object(s) (e.g., one or more faces) in images or other environmental representations (e.g., depth data point clouds) of the sensor data 226, identify how the apparatus 202 is moving based on pose data (e.g., location, accelerometer, gyroscope, and/or IMU data) of the sensor data 226, identify portions of a touchscreen of the input interface(s) 220 that received touch input(s) from the input data 228, or combinations thereof. In some examples, the input interpreter 210 can detect facial expressions of the user, and/or gestures performed by the user, using the sensor data 226 and/or the input data 228.

Similarly, the input interpreter 257 of the head-mounted apparatus 252 can parse, interpret, convert, reformat, and/or detect elements within the sensor data 268 and/or the input data 270. The input interpreter 257 may generate input information based on the sensor data 268 and/or the input data 270, and may output the input information to other elements run by the processor 256, such as the image processor 258 for display formatting, and/or to the processor 206 of the apparatus 202 (e.g., by sending the input information from the transceiver(s) 266 of the head-mounted apparatus 252 to the transceiver(s) 224 of the apparatus 202). The input information may identify various detections, identifications, and/or determinations made by the input interpreter 257 based on the sensor data 268 and/or the input data 270, such as any of the types of data described above with respect to the input interpreter 210.

The apparatus 202 includes the first content generator 212 and the second content generator 214. The first content generator 212 and/or the second content generator 214 may be part of the software application 208. The first content generator 212 generates first content 230 to be output using the output device(s) 222 of the apparatus 202. For instance, the first content 230 can include visual content (e.g., one or more images and/or videos) to be output using one or more displays of the output device(s) 222 of the apparatus 202 and/or audio content (e.g., one or more sounds, music clips, and/or audio clips) to be output using one or more speakers and/or one or more headphones of the output device(s) 222 of the apparatus 202. The second content generator 214 generates second content 232 to be sent from the apparatus 202 to the head-mounted apparatus 252 (e.g., using the communication(s) 250) and output using the output device(s) 264 of the head-mounted apparatus 252. For instance, the second content 232 can include visual content (e.g., one or more images and/or videos) to be output using one or more displays of the output device(s) 264 of the head-mounted apparatus 252 and/or audio content (e.g., one or more sounds, music clips, and/or audio clips) to be output using one or more speakers and/or one or more headphones of the output device(s) 264 of the head-mounted apparatus 252.

In some examples, to generate the first content 230 and/or the second content 232, the first content generator 212 and/or the second content generator 214 can generate two respective representations of an element (e.g., a shared element). For example, the first content generator 212 can generate the first content 230 to include a first representation (e.g., a first view, a first depiction, a first perspective, a first portion, a first level of detail, a first resolution, and/or a first size) of the element, and the second content generator 214 can generate the second content 232 to include a second representation (e.g., a second view, a second depiction, a second perspective, a second portion, a second level of detail, a second resolution, and/or a second size) of the element. The element can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrehedrons, other polyhedrons, rounded polyhedrons with one or more rounded edges and/or corners, portions thereof, or combinations thereof), textures for shapes, bump-mapping for shapes, lighting effects, or combinations thereof. In some examples, the element can include at least a portion of an environment. The environment may be a real-world environment, a virtual environment (e.g., of in a video game or VR environment), and/or a mixed environment that includes real-world environment elements and virtual environment elements. In some examples, the first content 230 includes a two-dimensional (2D) view of the element, while the second content 232 includes a three-dimensional (3D) view of the element. In some examples, the first content 230 includes a three-dimensional (3D) view of the element, while the second content 232 includes a two-dimensional (2D) view of the element.

In some examples, to generate the first content 230 and/or the second content 232, the first content generator 212 and/or the second content generator 214 can use the input information from the input interpreter 210, the sensor data 226 from the sensor(s) 218, the input data 228 from the input interface(s) 220, the input information from the input interpreter 257 of the head-mounted apparatus 252 (transferred from the head-mounted apparatus 252 to the apparatus 202 using the communication(s) 250), the sensor data 268 from the sensor(s) 260 of the head-mounted apparatus 252 (transferred from the head-mounted apparatus 252 to the apparatus 202 using the communication(s) 250), the input data 270 from the input interface(s) 262 of the head-mounted apparatus 252 (transferred from the head-mounted apparatus 252 to the apparatus 202 using the communication(s) 250), or a combination thereof. For example, the first content generator 212 can determine a pose (e.g., location in 3D space, pitch, roll, and/or yaw) of the apparatus 202 based on the input information from the input interpreter 210, the sensor data 226, and/or the input data 228. The first content generator 212 can generate the first content 230 to include a view of one or more elements (e.g., an environment) from a perspective or field of view (FOV) that is based on the determined pose of the apparatus 202. Similarly, the second content generator 214 can determine a pose (e.g., location in 3D space, pitch, roll, and/or yaw) of the head-mounted apparatus 252 based on the input information from the input interpreter 257, the sensor data 268, and/or the input data 278, as received by the apparatus 202 from the head-mounted apparatus 252 (e.g., using the communication(s) 250). The second content generator 214 can generate the second content 232 to include a view of one or more elements (e.g., an environment) from a perspective or field of view (FOV) that is based on the determined pose of the head-mounted apparatus 252.

In some examples, the first content generator 212 and/or the second content generator 214 can generate the first content 230 and/or the second content 232 based on the software application type of the software application 208. For example, if the software application type is a video game, the first content 230 and/or the second content 232 can depict and/or include an environment of the video game, for instance with one or more characters and/or items in the environment. If the software application type is a media asset viewer application, the first content 230 and/or the second content 232 can depict and/or include various media assets viewed and/or viewable using the media asset viewer application. If the software application type is a reading application (e.g., for books, magazines, newspapers, recipes, blogs, and/or social media), the first content 230 and/or the second content 232 can depict and/or include various strings of characters that are readable using the reading application. If the software application type is a calculator application, the first content 230 and/or the second content 232 can depict and/or include various numbers, variables, equations, charts, and/or graphs that are calculated and/or generated using the calculator application. Examples of different types of first content 230 and second content 232 associated with different types of software application 208 are illustrated in FIGS. 5-10.

The apparatus 202 includes one or more output devices 222. In response to generating the first content 230, the first content generator 212 can transfer the first content 230 to the output device(s) 222 of the apparatus 202 so that the first content 230 can be output by the output device(s) 222. The output device(s) 222 receive the first content 230 and output the first content 230. The output device(s) 222 can include, for example, one or more displays, one or more projectors, one or more speakers, one or more headphones, one or more headsets, one or more haptic feedback actuators, one or more haptic feedback motors, output device(s) 1335, another output device described herein, one or more connectors (e.g., ports, jacks, cables, wireless transceivers) through which one of the previously-listed output devices can be coupled to the apparatus 202, or a combination thereof. In some examples, the output device(s) 222 can include one or more buffers, which the first content generator 212 can send the first content 230 to so that the first content 230 is temporarily stored in the one or more buffers before being output by the output device(s) 222. In an illustrative example, the first content 230 can include visual content (e.g., one or more images and/or videos) that the first content generator 212 can send to a display buffer to temporarily store the visual content in the display buffer before the visual content is output (displayed) by one or more displays and/or projectors of the output device(s) 222. In another illustrative example, the first content 230 can include audio content (e.g., one or more sounds, music clips, and/or audio clips)

that the first content generator 212 can send to an audio buffer to temporarily store the audio content in the audio buffer before the audio content is output (played) by one or more speakers, headphones, and/or headsets of the output device(s) 222.

The apparatus 202 includes one or more transceivers 224. The transceiver(s) 224 can include wired, electrical, and/or physical transceiver(s) that can include receiver(s), transmitter(s) transceiver(s), cable(s), wire(s), pin(s), port(s), plug(s), jack(s), connector(s), or combinations thereof. The transceiver(s) 224 can include wireless transceiver(s) that can include receiver(s), transmitter(s) transceiver(s), antenna(e), antenna array(s), coil(s), or combinations thereof. The transceiver(s) 224 can include universal serial bus (USB) connector(s), Lightning connector(s), Ethernet connector(s), Bluetooth® transceiver(s), Bluetooth® Low Energy transceiver(s), Near Field Communication (NFC) transceiver(s), Wi-Fi transceivers, Li-Fi transceiver(s), Local Area Network (LAN) transceiver(s), Wireless Local Area Network transceiver(s), IEEE 802.11 transceiver(s), IEEE 802.15 transceiver(s), Wide Area Network transceiver(s), Personal Area Network (PAN) transceiver(s), Body Area Network (BAN) transceiver(s), Campus Area Network (CAN) transceiver(s), Metropolitan Area Network (MAN) transceiver(s), Storage Area Network (SAN) transceiver(s), Enterprise Private Network (EPN) transceiver(s), Virtual Private Network (VPN) transceiver(s), inductive transceiver(s), Industrial-Scientific-Medical (ISM) band transceiver(s), Radio Frequency (RF) transceiver(s), Infrared Data Association (IrDA) transceiver(s), Infrared (IR) transceiver(s), Visible Light Communication (VLC) transceiver(s), communication interface(s) 1340, or combinations thereof. The head-mounted apparatus 252 also includes one or more transceivers 266. The transceiver(s) 266 can include any of the types of transceiver(s), connectors, and/or communication interfaces listed above with respect to the transceiver(s) 224. The apparatus 202 and the head-mounted apparatus 252 can communicate by sending one or more communications 250 between the transceiver(s) 224 of the apparatus 202 and the transceiver(s) 266 of the head-mounted apparatus 252. In some examples, the communication(s) 250 include at least one communication sent from the transceiver(s) 224 of the apparatus 202 to the transceiver(s) 266 of the head-mounted apparatus 252. In some examples, the communication(s) 250 include at least one communication sent from the transceiver(s) 266 of the head-mounted apparatus 252 to the transceiver(s) 224 of the apparatus 202.

In some examples, once the second content generator 214 generates the second content 232, the second content generator 214 can send the second content 232 to the transceiver(s) 224 of the apparatus 202, to be sent by the transceiver(s) 224 of the apparatus 202 to the transceiver(s) 266 of the head-mounted apparatus 252 using the communication(s) 250. The head-mounted apparatus 252 can receive the second content 232 by receiving the communication(s) 250 using the transceiver(s) 266, from the transceiver(s) 224 of the apparatus 202. The head-mounted apparatus 252 includes output device(s) 264, which can include any of the types of output devices described with respect to the output device(s) 222 of the apparatus 202. In some examples, in response to receiving the second content 232 using the transceiver(s) 266 of the head-mounted apparatus 252, the head-mounted apparatus 252 sends the second content 232 to the output device(s) 264 and/or to one or more buffers associated with the output device(s) 264, to be output using the output device(s) 264. In an illustrative example, the second content 232 can include visual content (e.g., one or more images and/or videos) that the second content generator 214 can send (e.g., over the communication(s) 250) to a display buffer of the head-mounted apparatus 252 to temporarily store the visual content in the display buffer before the visual content is output (displayed) by one or more displays and/or projectors of the output device(s) 264. In another illustrative example, the second content 232 can include audio content (e.g., one or more sounds, music clips, and/or audio clips) that the second content generator 214 can send (e.g., over the communication(s) 250) to an audio buffer of the head-mounted apparatus 252 to temporarily store the audio content in the audio buffer before the audio content is output (played) by one or more speakers, headphones, and/or headsets of the output device(s) 264 of the head-mounted apparatus 252.

In some examples, once the second content generator 214 generates the second content 232, the second content generator 214 can send the second content 232 to the image processor 216 for display formatting and/or to the image processor 258 for display formatting. The image processor 216 for display formatting and/or to the image processor 258 for display formatting can process, modify, format, reformat, and/or update the second content 232 to generate processed second content 234. The processed second content 234 may be processed based on types, shapes, and/or formats of at least some of the output device(s) 264 of the head-mounted apparatus 252. For example, if output device(s) 264 of the head-mounted apparatus 252 include stereoscopic display(s) that display content to each of the eyes of the head-mounted apparatus 252, the image processor 216 for display formatting and/or to the image processor 258 for display formatting may generate, as the processed second content 234, two stereoscopic images based on the second content 232, to be sent to and displayed by the stereoscopic display(s) of the output device(s) 264 of the head-mounted apparatus 252. In some examples, output device(s) 264 of the head-mounted apparatus 252 may include curved display(s), and the image processor 216 for display formatting and/or to the image processor 258 for display formatting may generate the processed second content 232 by warping, distorting, and/or skewing the second content 232 based on the curvature of the curved display(s), before sending the processed second content 234 to be displayed by the curved display(s) of the output device(s) 264 of the head-mounted apparatus 252. In some examples, the image processor 216 for display formatting and/or to the image processor 258 for display formatting may generate the processed second content 232 by modifying parameters of the visual content of the second content 232 (e.g., brightness, saturation, color space, and/or tone) for optimal viewing based on a type of display technology included in the output device(s) 264 of the head-mounted apparatus 252, for instance whether a display of the output device(s) 264 is an LCD display, an OLED display, a mini-LED display, a plasma display, a projector-based display, an electronic ink display, a laser display, another type of display described herein, or a combination thereof. In some examples, the image processor 216 for display formatting and/or to the image processor 258 for display formatting may generate the processed second content 232 by modifying a perspective and/or field of view of the visual content of the second content 232 based on a pose of the head-mounted apparatus 252 (as determined based on the sensor data 268, the input data 270, the input information from the input interpreter 257, or a combination thereof), for instance including the location, pitch, roll, and/or yaw of head-mounted apparatus 252.

The apparatus 202 includes a power system 238. In some examples, the power system 238 can include one or more power storage elements, such as one or more batteries, one or more rechargeable batteries, one or more replaceable batteries, one or more fuel containers, one or more fuel cells, one or more generators, or a combination thereof. The power system 238 can provide power to at least some of the components of the apparatus 202, including the processor(s) 206, the storage device(s) 236, the sensor(s) 218, the input interface(s) 220, the output device(s) 222, the transceiver(s) 224, or a combination thereof. In some examples, the power system 238 can draw power from an external power source, for instance using a plug, a port, a connector, an inductive charger, a capacitive charger, or a combination thereof. In some examples, the power system 238 can provide power to an external power recipient device, for instance using a plug, a port, a connector, an inductive charger, a capacitive charger, or a combination thereof.

The head-mounted apparatus 252 includes a power system 274. In some examples, the power system 274 can include one or more power storage elements of any of the types of power storage elements described with respect to the power system 238 of the apparatus 202. The power system 274 can provide power to at least some of the components of the head-mounted apparatus 252, including the processor(s) 256, the storage device(s) 272, the sensor(s) 260, the input interface(s) 262, the output device(s) 264, the transceiver(s) 266, or a combination thereof. In some examples, the power system 274 can draw power from an external power source, such as any of the types of external power sources described with respect to the power system 238 of the apparatus 202. In some examples, the power system 274 can provide power to an external power recipient device, such as any of the types of external power recipient devices described with respect to the power system 238 of the apparatus 202.

In some examples, the apparatus 202 and the head-mounted apparatus 252 can transition from a decoupled state to a coupled state by coupling (e.g., communicatively, wirelessly, physically, and/or electrically) the transceiver(s) 224 and the transceiver(s) 266. In some examples, the apparatus 202 and the head-mounted apparatus 252 can transition from the coupled state to the decoupled state by decoupling (e.g., communicatively, wirelessly, physically, and/or electrically) the transceiver(s) 224 from the transceiver(s) 266. In some examples, the apparatus 202 and the head-mounted apparatus 252 are in the coupled state when the apparatus 202 and the head-mounted apparatus 252 are physically connected together, for instance using a wire or cable. In some examples, the apparatus 202 and the head-mounted apparatus 252 are in the decoupled state when a wire or cable that could couple the apparatus 202 and the head-mounted apparatus 252 is unplugged or otherwise disconnected from the apparatus 202, the head-mounted apparatus 252, or both. In some examples, the apparatus 202 and the head-mounted apparatus 252 are in the coupled state when the apparatus 202 and the head-mounted apparatus 252 are wirelessly connected, for instance when the apparatus 202 and the head-mounted apparatus 252 are located in wireless communication range of one another based on the wireless communication range(s) of the transceiver(s) 224 and/or the transceiver(s) 266. In some examples, the apparatus 202 and the head-mounted apparatus 252 are in the decoupled state when the apparatus 202 and the head-mounted apparatus 252 are not wirelessly connected, for instance when the apparatus 202 and the head-mounted apparatus 252 are located too far from one another to be in wireless communication range of one another, and are therefore outside of wireless communication range of one another, based on the wireless communication range(s) of the transceiver(s) 224 and/or the transceiver(s) 266. In some examples, the apparatus 202 and the head-mounted apparatus 252 are in the decoupled state when the transceiver(s) 224 and/or the transceiver(s) 266 are disabled. In some examples, the apparatus 202 and the head-mounted apparatus 252 can be in the coupled state when the transceiver(s) 224 and/or the transceiver(s) 266 are enabled.

Figure 3A:
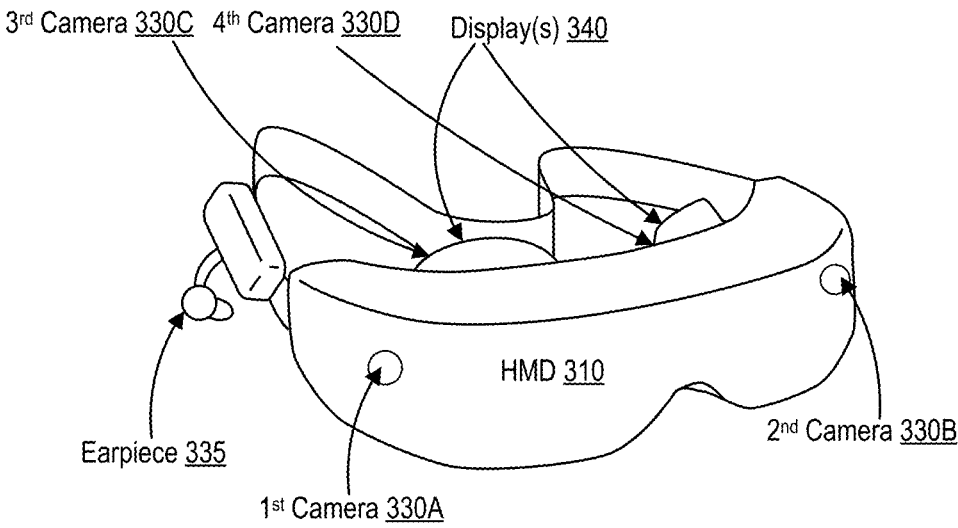
FIG. 3A is a perspective diagram illustrating a head-mounted display (HMD) that is used as at least a part of an extended reality (XR) system, in accordance with some examples.

FIG. 3A is a perspective diagram 300 illustrating a head-mounted display (HMD) 310 that is used as at least a part of an extended reality (XR) system 200. The HMD 310 may be, for example, an augmented reality (AR) headset, a virtual reality (VR) headset, a mixed reality (MR) headset, an extended reality (XR) headset, or some combination thereof. The HMD 310 may be an example of at least a portion of an XR system 200. The HMD 310 may be an example of the apparatus 202. The HMD 310 may be an example of the head-mounted apparatus 252. The HMD 310 includes a first camera 330A and a second camera 330B along a front portion of the HMD 310. The first camera 330A and the second camera 330B may be examples of the sensor(s) 218 of the apparatus 202 and/or of the sensor(s) 260 of the head-mounted apparatus 252. The HMD 310 includes a third camera 330C and a fourth camera 330D facing the eye(s) of the user as the eye(s) of the user face the display(s) 340. The third camera 330C and the fourth camera 330D may be examples of the sensor(s) 218 of the apparatus 202 and/or of the sensor(s) 260 of the head-mounted apparatus 252. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of user-facing sensors and/or environment-facing sensors. Such additional sensors may also be examples of the sensor(s) 218 of the apparatus 202 and/or of the sensor(s) 260 of the head-mounted apparatus 252. In some examples, each of the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on or around the user 320's head. The one or more displays 340 of the HMD 310 can be examples of display(s) of the output device(s) 222 of the apparatus 202 and/or of display(s) of the output device(s) 264 of the head-mounted apparatus 252. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the left eye of the user 320 sees a right side of the display. In some examples, the HMD 310 may include two displays 340, including a left display that displays content to the user 320's left eye and a right display that displays content to a user 320's right eye. In some examples, visual content displayed using the display(s) 340 includes the first content 230 generated by the first content generator 212. In some examples, visual content displayed using the display(s) 340 includes the second content 232 generated by the second content generator 214, the processed second content 234 processed by the image processor 216 for display formatting, and/or the processed second content 234 processed by the image processor 258 for display formatting. In some examples, one or more displays 340 of the HMD 310 can include one or more digital "pass-through" displays, in which case the content displayed on the display(s) 340 can include, and/or be based on, view(s) of the real-world captured by the first camera 330A and/or the second camera 330B. In some examples, the one or more displays 340 can include one or more optical "see-through" displays, in which case light from the real-world environment may pass through at least portion(s) of the one or more displays 340 (e.g., which may be transparent, translucent, light-receptive, light-permissive, and/or light-transmissive) to reach the eyes of the user.

Figure 3B:
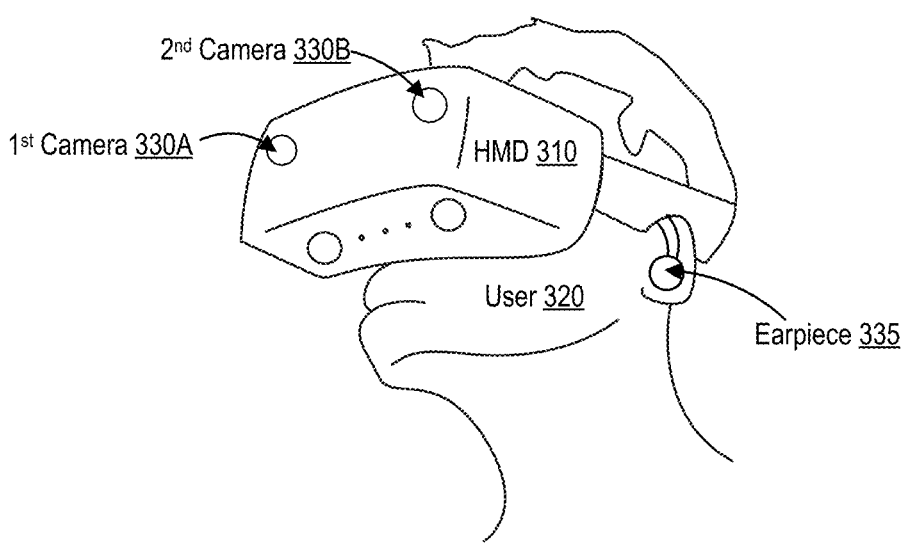
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310. One earpiece 335 is illustrated in FIGS. 3A and 3B, but it should be understood that the HMD 310 can include two earpieces, with one earpiece for each ear (left ear and right ear) of the user. The one or more earpieces 335 can be examples of audio output device(s) of the output device(s) 222 of the apparatus 202 and/or of audio output device(s) of the output device(s) 264 of the head-mounted apparatus 252. In some examples, the HMD 310 can also include one or more microphones (not pictured). The one or more microphones can be examples of the sensor(s) 218 of the apparatus 202 and/or of the sensor(s) 260 of the head-mounted apparatus 252. In some examples, the audio output by the HMD 310 to the user through the one or more earpieces 335 may include, or be based on, audio recorded using the one or more microphones.

FIG. 3B is a perspective diagram 350 illustrating the head-mounted display (HMD) 310 of FIG. 3A being worn by a user 320. The user 320 wears the HMD 310 on or around the user 320's head, at least partially over the user 320's eyes. The HMD 310 can capture images with the first camera 330A and the second camera 330B. In some examples, the HMD 310 displays one or more output images toward the user 320's eyes using the display(s) 340. In some examples, the output images can include the first content 230 generated by the first content generator 212, the second content 232 generated by the second content generator 214, the processed second content 234 processed by the image processor 216 for display formatting, and/or the processed second content 234 processed by the image processor 258 for display formatting. In some examples, the output images (e.g., of the first content 230, the second content 232, and/or the processed second content 234) can be based on the images captured by the first camera 330A and the second camera 330B, for example with the virtual content overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (e.g., eye positions, movements, reactions, and/or reflexes), user's face (e.g., facial expressions, vocalizations), and/or other portions of the user (e.g., gestures). An earpiece 335 of the HMD 310 is illustrated in an ear of the user 320. The HMD 310 may be outputting audio to the ear(s) of the user 320 through the earpiece 335 in one ear of the user 320 and/or through another earpiece (not pictured) of the HMD 310 that is in the other ear (not pictured) of the user 320.

Figure 4A:
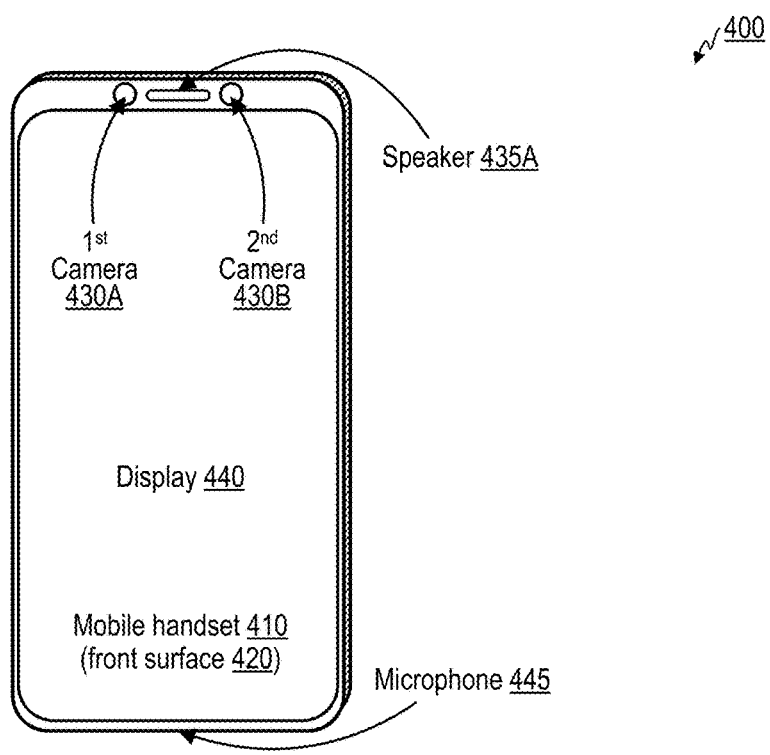
FIG. 4A is a perspective diagram illustrating a front surface of a mobile handset that includes front-facing cameras and that can be used as at least a part of an extended reality (XR) system, in accordance with some examples.

FIG. 4A is a perspective diagram 400 illustrating a front surface 420 of a mobile handset 410 that includes front-facing cameras 430A-430B and that can be used as at least a part of an extended reality (XR) system 200. The mobile handset 410 may be an example of at least a portion of an XR system 200. The mobile handset 410 may be an example of the apparatus 202. The mobile handset 410 may be an example of the head-mounted apparatus 252. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the sensor(s) 218 of the apparatus 202 and/or of the sensor(s) 260 of the head-mounted apparatus 252. In some examples, the first camera 430A and the second camera 430B can face the user, including the eye(s) of the user, while visual content is displayed on the display 440. The display 440 may be an example of a display of the output device(s) 222 of the apparatus 202 and/or of a display of the output device(s) 264 of the head-mounted apparatus 252. The visual content can include the first content 230 generated by the first content generator 212, the second content 232 generated by the second content generator 214, the processed second content 234 processed by the image processor 216 for display formatting, and/or the processed second content 234 processed by the image processor 258 for display formatting.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. The first camera 430A and the second camera 430B may be the sensor 405A and the sensor 405B, respectively. In some examples, the front surface 420 of the mobile handset 410 may only have a single camera.

In some examples, the front surface 420 of the mobile handset 410 may include one or more additional cameras in addition to the first camera 430A and the second camera 430B. The one or more additional cameras may also be examples of the sensor(s) 218 of the apparatus 202 and/or of the sensor(s) 260 of the head-mounted apparatus 252. In some examples, the front surface 420 of the mobile handset 410 may include one or more additional sensors in addition to the first camera 430A and the second camera 430B. The one or more additional sensors may also be examples of the sensor(s) 218 of the apparatus 202 and/or of the sensor(s) 260 of the head-mounted apparatus 252. In some cases, the front surface 420 of the mobile handset 410 includes more than one display 440. The one or more displays 440 of the front surface 420 of the mobile handset 410 can be examples of display(s) of the output device(s) 222 of the apparatus 202 and/or of display(s) of the output device(s) 264 of the head-mounted apparatus 252. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. The one or more speakers 435A can be examples of audio output device(s) of the output device(s) 222 of the apparatus 202 and/or of audio output device(s) of the output device(s) 264 of the head-mounted apparatus 252. In some examples, the mobile handset 410 can also include one or more microphones 445. The one or more microphones 445 can be examples of the sensor(s) 218 of the apparatus 202 and/or of the sensor(s) 260 of the head-mounted apparatus 252. In some examples, the mobile handset 410 can include one or more microphones along and/or adjacent to the front surface 420 of the mobile handset 410, with these microphones being examples of the sensor(s) 218 of the apparatus 202 and/or of the sensor(s) 260 of the head-mounted apparatus 252. In some examples, the audio output by the mobile handset 410 to the user through the one or more speakers 435A and/or other audio output devices may include, or be based on, audio recorded using the one or more microphones.

Figure 4B:
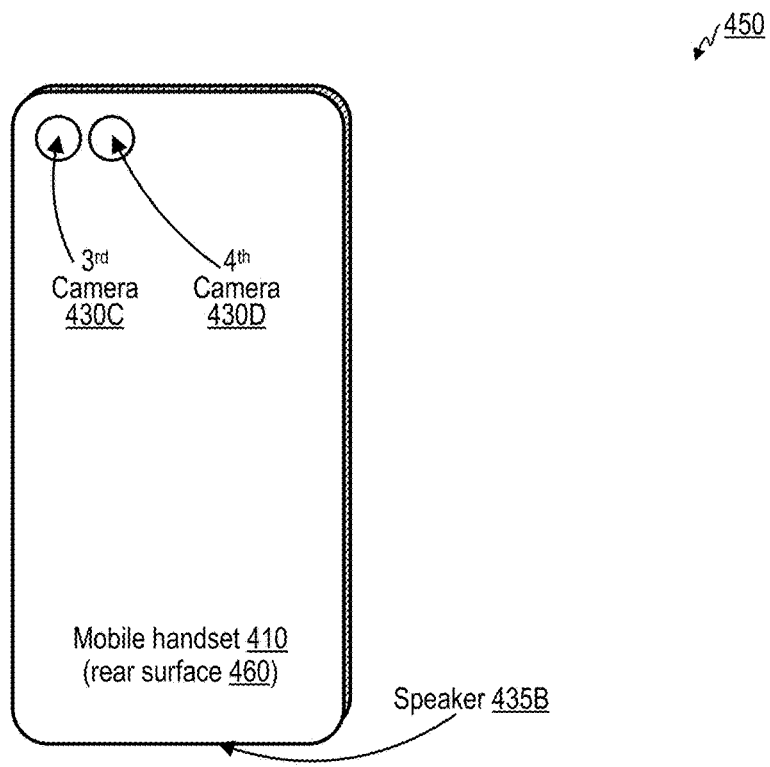
FIG. 4B is a perspective diagram illustrating a rear surface of the mobile handset of FIG. 4A that includes rear-facing cameras, in accordance with some examples.

FIG. 4B is a perspective diagram illustrating a rear surface 460 of the mobile handset 410 of FIG. 4A that includes rear-facing cameras 430C-430D. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor(s) 218 of the apparatus 202 and/or of the sensor(s) 260 of the head-mounted apparatus 252. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor(s) 218 of the apparatus 202 and/or of the sensor(s) 260 of the head-mounted apparatus 252. In some examples, the rear surface 460 of the mobile handset 410 may include one or more additional sensors in addition to the third camera 430C and the fourth camera 430D. The one or more additional sensors may also be examples of the sensor(s) 218 of the apparatus 202 and/or of the sensor(s) 260 of the head-mounted apparatus 252. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. The one or more speakers 435B can be examples of audio output device(s) of the output device(s) 222 of the apparatus 202 and/or of audio output device(s) of the output device(s) 264 of the head-mounted apparatus 252. In some examples, the mobile handset 410 can also include one or more microphones (not pictured). The one or more microphones can be examples of the sensor(s) 218 of the apparatus 202 and/or of the sensor(s) 260 of the head-mounted apparatus 252. In some examples, the mobile handset 410 can include one or more microphones along and/or adjacent to the rear surface 460 of the mobile handset 410, with these microphones being examples of the sensor(s) 218 of the apparatus 202 and/or of the sensor(s) 260 of the head-mounted apparatus 252. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images. The output images can include, or be part of, the first content 230 generated by the first content generator 212, the second content 232 generated by the second content generator 214, the processed second content 234 processed by the image processor 216 for display formatting, and/or the processed second content 234 processed by the image processor 258 for display formatting. The output images can be based on the images captured by the third camera 430C and/or the fourth camera 430D, for example with the virtual content overlaid. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5:
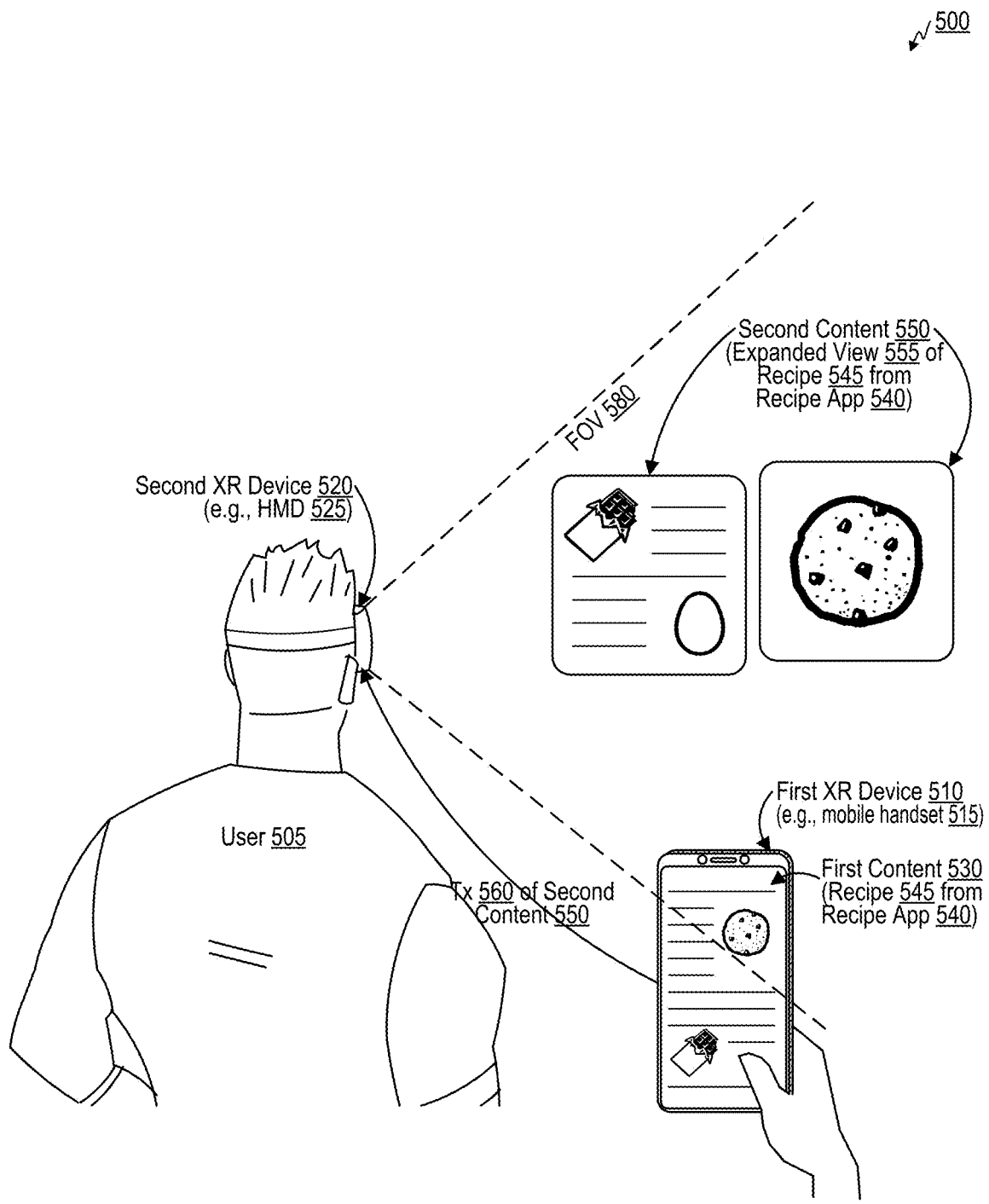
FIG. 5 is a conceptual diagram illustrating an apparatus displaying first content and transmitting second content to a head-mounted apparatus that displays the second content, where the first content and the second content correspond to a recipe from a recipe app running on the apparatus, in accordance with some examples.

FIG. 5 is a conceptual diagram 500 illustrating a apparatus 510 displaying first content 530 and transmitting second content 550 to a head-mounted apparatus 520 that displays the second content 550, where the first content 530 and the second content 550 correspond to a recipe 545 from a recipe app 540 running on the apparatus 510. The apparatus 510 is an example of the apparatus 202 of the XR system 200 of FIG. 2. The apparatus 510 is illustrated as a mobile handset 515. The mobile handset 515 may be an example of the mobile handset 410. The head-mounted apparatus 520 is an example of the head-mounted apparatus 252 of the XR system 200 of FIG. 2. The head-mounted apparatus 520 is illustrated as a HMD 525 worn by a user 505. The HMD 525 may be an example of the HMD 310. The user 505 may be an example of a user 320. The apparatus 510 is illustrated as being held by a hand, which may be a hand of the user 505.

The apparatus 510 runs a recipe app 540, which is an example of the software application 208 of the apparatus 202. The recipe app 540, and/or another portion of the apparatus 510, includes a first content generator (e.g., first content generator 212) that generates first content 530. The first content 530 is an example of the first content 230. In FIG. 5, the first content 530 includes a recipe 545 from the recipe app 540. The recipe 545 is illustrated as a recipe for a chocolate chip cookie. The apparatus 510 is illustrated displaying the first content 230 (including the recipe 545) using a display of the apparatus 510. The first content 230 is illustrated as including strings of characters (e.g., a text portion of the recipe 545), an image of the chocolate chip cookie, and an image of a bar of chocolate. The display of the apparatus 510 is an example of one of the output device(s) 222 of the apparatus 202 and/or of the display 440 of the mobile handset 410.

The recipe app 540, and/or another portion of the apparatus 510, includes a second content generator (e.g., second content generator 214) that generates second content 550. In some examples, the recipe app 540, and/or another portion of the apparatus 510, includes an image processor for display formatting (e.g., the image processor 216 for display formatting), which may process the second content 550 for display using the display(s) and/or for output using other output device(s) of the head-mounted apparatus 520. The second content 550 can be an example of the second content 232 and/or of the processed second content 234.

The apparatus 510 transmits a transmission 560 to the head-mounted apparatus 520, and the head-mounted apparatus 520 receives the transmission 560 from the apparatus 510. The transmission 560 includes the second content 550. The transmission 560 can be sent from transceiver(s) of the apparatus 510, which may be examples of the transceiver(s) 224 of the apparatus 202. The transmission 560 can be received from transceiver(s) of the head-mounted apparatus 520, which may be examples of the transceiver(s) 266 of the head-mounted apparatus 252. The transmission 560 can be an example of the communication(s) 250. The transmission 560 is illustrated by an arrow pointing from the apparatus 510 to the head-mounted apparatus 520. In some examples, the arrow represents the transmission 560 traveling over a wire or cable physically, electrically, and/or communicatively coupling the apparatus 510 and the head-mounted apparatus 520 together. In some examples, the arrow represents the transmission 560 traveling through the air as a wireless signal over a wireless connection wirelessly and/or communicatively coupling the apparatus 510 and the head-mounted apparatus 520 together. In some examples, the head-mounted apparatus 520 may also send information to the apparatus 510 using the same transceiver(s) involved in sending the transmission 560 from the apparatus 510 to the head-mounted apparatus 520. For example, the head-mounted apparatus 520 may send information to the apparatus 510 requesting the transmission 560 of the second content 550 and/or confirming receipt of at least a portion of the transmission 560 with the second content 550.

The head-mounted apparatus 520 includes one or more displays, which can be examples of the output device(s) 222 of the apparatus 202 and/or of the display(s) 340 of the HMD 310. The user 505 is able to see a field of view (FOV) 580 of an environment (e.g., real-world, virtual, augmented, and/or mixed) through the display(s) of the head-mounted apparatus 520. In some examples, the display(s) of the head-mounted apparatus 520 display at least a subset of the content in the FOV 580. The head-mounted apparatus 520 displays at least a portion of the second content 550 in the FOV 580 using the display(s) of the head-mounted apparatus 520. The second content 550 includes an expanded view 555 of the recipe 545 from the recipe app 540. For example, the expanded view 555 of the recipe 545 is illustrated as including two panels, one with a large image of the chocolate chip cookie, and the other with strings of characters (e.g., a text portion of the recipe 545), an image of a bar of chocolate, and an image of an egg. In some examples, the expanded view 555 of the recipe 545 in the second content 550 includes more of the recipe 545 than is presented in the first content 530, for instance with the image of the egg present in the second content 550 but missing from the first content 530. In some examples, the head-mounted apparatus 520, includes an image processor for display formatting (e.g., the image processor 258 for display formatting), which may process the second content 550 for display using the display(s) and/or for output using other output device(s) of the head-mounted apparatus 520.

Display of the second content 550 to the user 505 using the head-mounted apparatus 520 can provide useful technical improvements over the user 505 viewing the recipe 545 in the first content 530 displayed on the apparatus 510. In some examples, the expanded view 555 of the recipe 545 may appear larger in the FOV 580 than the view of the recipe 545 in the first content 530, making the expanded view 555 more useful by providing increased accessibility, for instance if the user 505 has issues with vision. In some examples, the expanded view 555 of the recipe 545 may stay in the FOV 580 even if the user 505 turns his or her head and regardless of whether the apparatus 510 is in the FOV 580 or not, allowing the user 505 to move about a kitchen while still retaining a view of the recipe 545, for example. In some examples, the expanded view 555 of the recipe 545 may include one or more elements in common with the view of the recipe 545 in the first content 530 (e.g., the image of the chocolate chip cookie, the image of the bar of chocolate, and/or at least some of the strings of characters). In some examples, the expanded view 555 of the recipe 545 may include one or more additional elements that do not appear in the view of the recipe 545 in the first content 530 (e.g., the image of the egg and/or at least some of the strings of characters).

In some examples (not pictured), the apparatus 510 can instead be a HMD, such as the HMD 310 or the HMD 525, and may for instance be worn by a second user other than the user 505. In some examples (not pictured), the head-mounted apparatus 520 can instead be a mobile handset, such as the mobile handset 410 or the mobile handset 515, and may for held by the user 505 or by a second user other than the user 505.

Figure 6:
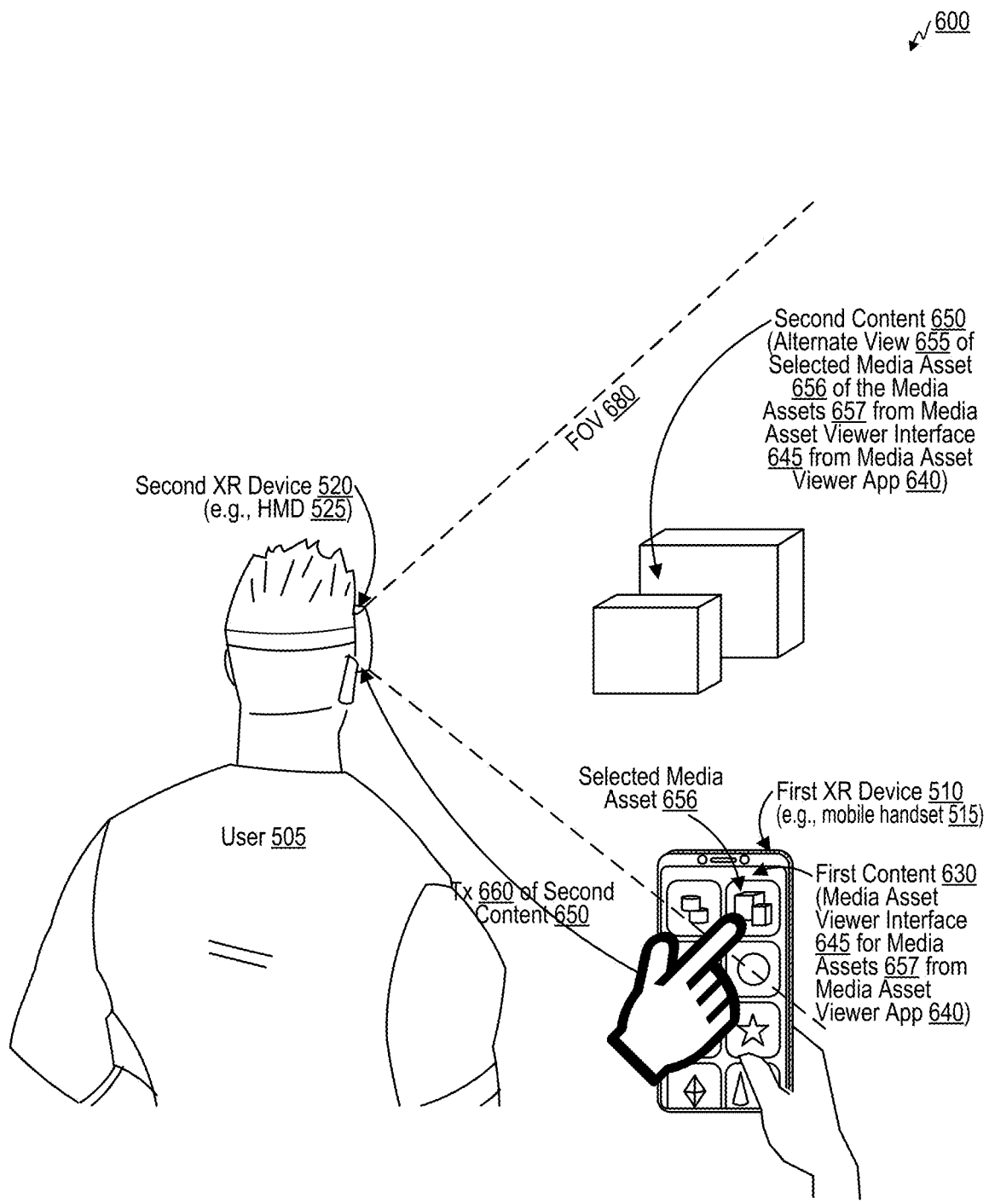
FIG. 6 is a conceptual diagram illustrating the apparatus displaying first content and transmitting second content to the head-mounted apparatus that displays the second content, where the first content and the second content correspond to at least a selected media asset from a media asset viewer app running on the apparatus, in accordance with some examples.

FIG. 6 is a conceptual diagram 600 illustrating the apparatus 510 displaying first content 630 and transmitting second content 650 to the head-mounted apparatus 520 that displays the second content 650, where the first content 630 and the second content 650 correspond to at least a selected media asset 646 from a media asset viewer app 640 running on the apparatus 510. The apparatus 510 runs a media asset viewer app 640, which is an example of the software application 208 of the apparatus 202. The media asset viewer app 640, and/or another portion of the apparatus 510, includes a first content generator (e.g., first content generator 212) that generates first content 630. The first content 630 is an example of the first content 230.

Figure 7:
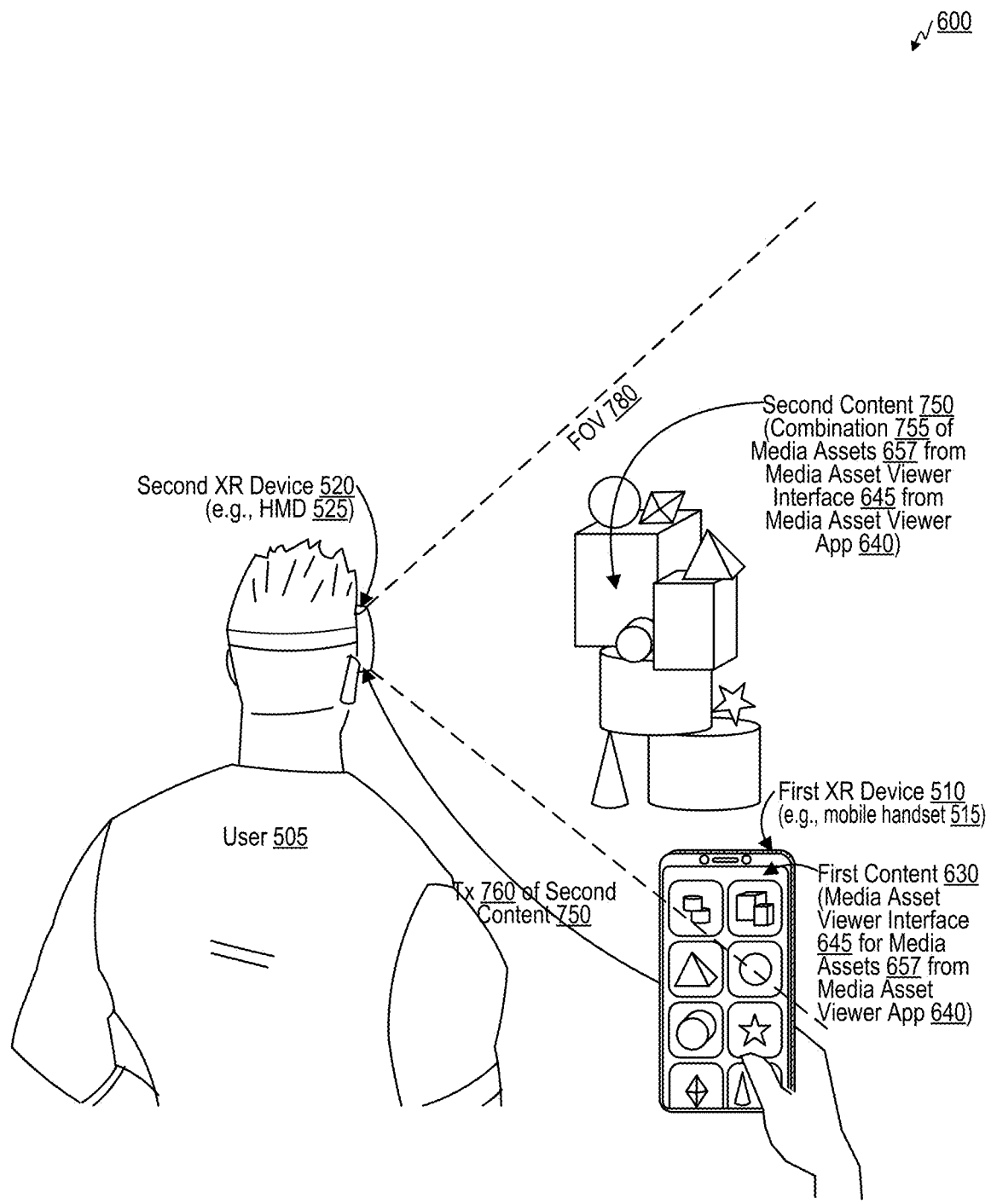
FIG. 7 is a conceptual diagram illustrating the apparatus displaying first content and transmitting second content to the head-mounted apparatus that displays the second content, where the first content and the second content correspond to media assets from a media asset viewer app running on the apparatus, in accordance with some examples.

The first content 630 includes a media asset viewer interface 645 of the media asset viewer app 640. The media asset viewer interface 645 is illustrated as including a menu interface that the user 505 can view and/or select from various media assets 657. A hand of the user is illustrated touching the touchscreen of the apparatus 510 to select a selected media asset 656 of the media assets 657 by providing a touch input to the apparatus 510 at a location of the touchscreen at which a representation of the selected media asset 656 is displayed in the media asset viewer interface 645. The media assets 657 are illustrated as including 3D shapes. The media asset viewer interface 645 is also illustrated being displayed by the apparatus 510 in FIG. 7. The media assets 657 include a media asset depicting two stacked cylinders stacked on their flat circular sides, a media asset depicting two side-by-side rectangular prisms, a media asset depicting a pyramid, a media asset depicting a sphere, a media asset depicting a cylinder on its rounded side, a media asset depicting a star shape, a media asset depicting an octahedron, and a media asset depicting a cone. The selected media asset 656 is the media asset depicting the two side-by-side rectangular prisms that appears in the upper-right hand corner of the media asset viewer interface 645 as illustrated in FIGS. 6 and 7.

The media asset viewer app 640, and/or another portion of the apparatus 510, includes a second content generator (e.g., second content generator 214) that generates second content 650. In some examples, the media asset viewer app 640, and/or another portion of the apparatus 510, includes an image processor for display formatting (e.g., the image processor 216 for display formatting), which may process the second content 650 for display using the display(s) and/or for output using other output device(s) of the head-mounted apparatus 520. The second content 650 can be an example of the second content 232 and/or of the processed second content 234.

The apparatus 510 transmits a transmission 660 from transceiver(s) of the apparatus 510 (e.g., transceiver(s) 224) to transceiver(s) of the head-mounted apparatus 520 (e.g., transceiver(s) 266). The transceiver(s) of the head-mounted apparatus 520 receive the transmission 660 from the transceiver(s) of the apparatus 510. The transmission 660 can be an example of the communication(s) 250. The transmission 660 includes the second content 650. The transmission 660 can be sent and received as discussed with respect to the transmission 560 of FIG. 5 and/or the communication(s) 250 of FIG. 2. In some examples, the head-mounted apparatus 520 can also send information to the apparatus 510, for example requesting the transmission 660 of the second content 650 and/or confirming receipt of at least a portion of the transmission 660 with the second content 650.

The user 505 is able to see a field of view (FOV) 680 of an environment (e.g., real-world, virtual, augmented, and/or mixed) through the display(s) of the head-mounted apparatus 520. In some examples, the display(s) of the head-mounted apparatus 520 display at least a subset of the content in the FOV 680. The head-mounted apparatus 520 displays at least a portion of the second content 650 in the FOV 680 using the display(s) of the head-mounted apparatus 520. The second content 650 includes an alternate view 655 of the selected media asset 656 of the media assets 657 from the media asset viewer interface 645 of the media asset viewer app 640. The alternate view 655 of the selected media asset 656 is illustrated as depicting the selected media asset 656 from a different perspective, angle, and/or orientation compared to the depiction of the selected media asset 656 in the first content 630. For example, the alternate view 655 of the selected media asset 656 is illustrated as rotated approximately 90 degrees clockwise along a vertical yaw axis compared to the depiction of the selected media asset 656 in the first content 630. The selected media asset 656 may be an element that is present in both the first content 630 and the second content 650. In some examples, the depiction of the selected media asset 656 in the second content 650 may be more detailed than the depiction of the selected media asset 656 in the first content 630, for instance in terms of size, resolution, texture resolution, number of polygons, bump mapping fidelity, or a combination thereof.

FIG. 7 is a conceptual diagram 700 illustrating the apparatus 510 displaying first content 630 and transmitting second content 750 to the head-mounted apparatus 520 that displays the second content 750, where the first content 730 and the second content 750 correspond to media assets 657 from a media asset viewer app 740 running on the apparatus 510. The apparatus 510 runs the media asset viewer app 640 of FIG. 6, which is an example of the software application 208 of the apparatus 202. The media asset viewer app 640, and/or another portion of the apparatus 510, includes a first content generator (e.g., first content generator 212) that generates first content 630. The first content 630 is an example of the first content 230. Like the first content 630 of FIG. 6, The first content 630 of FIG. 7 includes the media asset viewer interface 645 for the media assets 657 from the media asset viewer app 640.

The media asset viewer app 640, and/or another portion of the apparatus 510, includes a second content generator (e.g., second content generator 214) that generates second content 750. In some examples, the media asset viewer app 640, and/or another portion of the apparatus 510, includes an image processor for display formatting (e.g., the image processor 216 for display formatting), which may process the second content 750 for display using the display(s) and/or for output using other output device(s) of the head-mounted apparatus 520. The second content 750 can be an example of the second content 232 and/or of the processed second content 234.

The apparatus 510 transmits a transmission 760 from transceiver(s) of the apparatus 510 (e.g., transceiver(s) 224) to transceiver(s) of the head-mounted apparatus 520 (e.g., transceiver(s) 266). The transceiver(s) of the head-mounted apparatus 520 receive the transmission 760 from the transceiver(s) of the apparatus 510. The transmission 760 can be an example of the communication(s) 250. The transmission 760 includes the second content 750. The transmission 760 can be sent and received as discussed with respect to the transmission 560 of FIG. 5, the transmission 660 of FIG. 6, and/or the communication(s) 250 of FIG. 2. In some examples, the head-mounted apparatus 520 can also send information to the apparatus 510, for example requesting the transmission 760 of the second content 750 and/or confirming receipt of at least a portion of the transmission 760 with the second content 750.

The user 505 is able to see a field of view (FOV) 780 of an environment (e.g., real-world, virtual, augmented, and/or mixed) through the display(s) of the head-mounted apparatus 520. In some examples, the display(s) of the head-mounted apparatus 520 display at least a subset of the content in the FOV 780. The head-mounted apparatus 520 displays at least a portion of the second content 750 in the FOV 780 using the display(s) of the head-mounted apparatus 520. The second content 750 includes a combination 755 of the media assets 657 from the media asset viewer interface 645 of the media asset viewer app 740. The combination 755 is illustrated as including all of the media assets 657 illustrated as being part of the media asset viewer interface 645 in the first content 630, stacked together to form the combination 755. For example, the sphere, octahedron, and pyramid are stacked atop the rectangular pyramid, which are stacked atop the stacked cylinders on their flat sides. The cylinder on its round side and the star are also stacked atop the stacked cylinders on their flat sides. One of the two stacked cylinders on their flat sides is supported by the cone. In some examples, the user 505 may interact with input interface(s) of the apparatus 510 and/or the head-mounted apparatus 520 to manipulate the combination 755, for instance to move the various media assets 657 within the combination 755 (e.g., relative to one another) like blocks, to resize media assets 657 relative to one another, to rotate or reorient the media assets 657 relative to one another, or combinations thereof.

Figure 8:
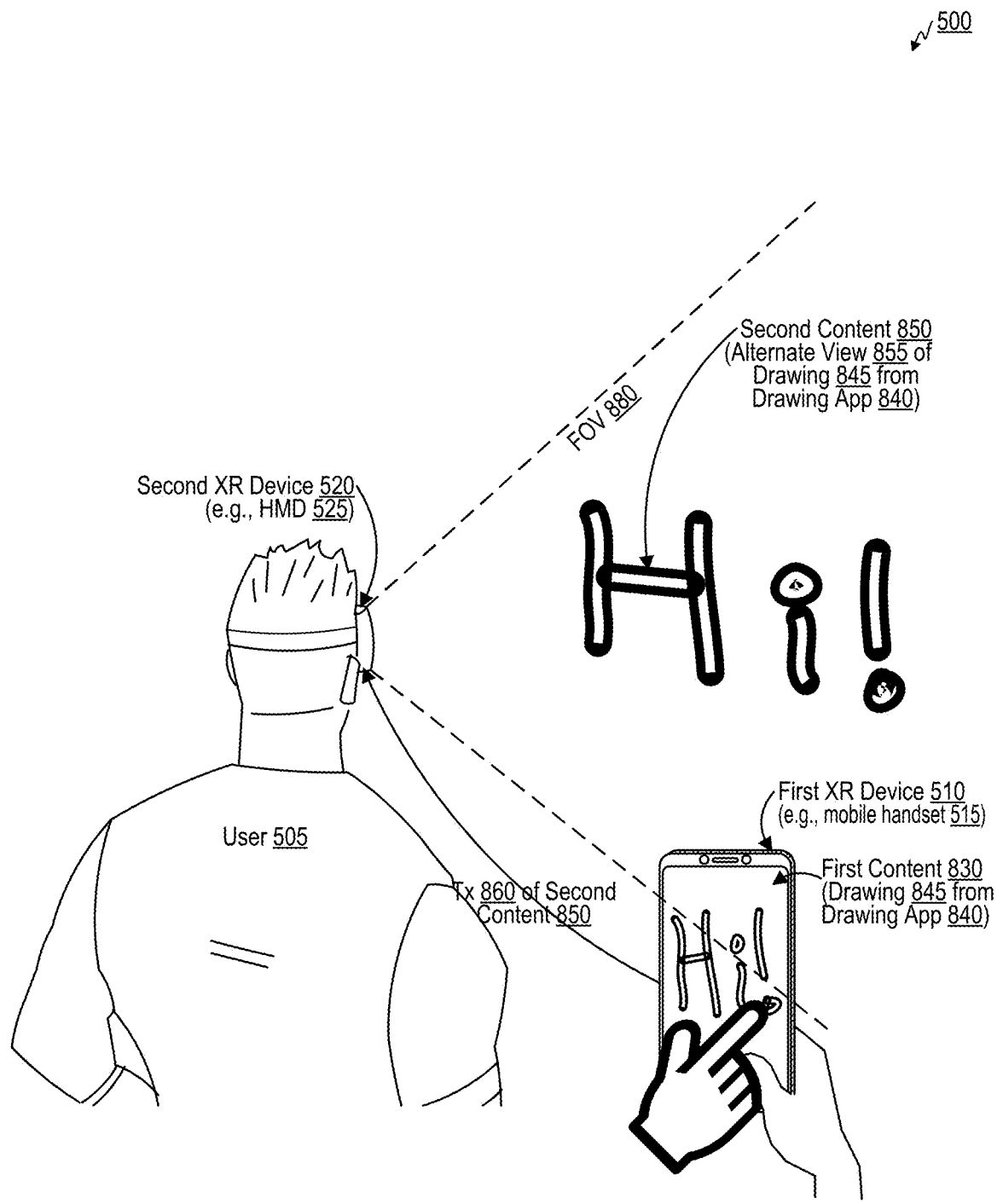
FIG. 8 is a conceptual diagram illustrating the apparatus displaying first content and transmitting second content to the head-mounted apparatus that displays the second content, where the first content and the second content correspond to an illustration from an illustration tool running on the apparatus, in accordance with some examples.

FIG. 8 is a conceptual diagram 800 illustrating the apparatus 510 displaying first content 830 and transmitting second content 850 to the head-mounted apparatus 520 that displays the second content 850, where the first content 830 and the second content 850 correspond to an illustration 845 from an illustration tool 840 running on the apparatus 510. The apparatus 510 runs a illustration tool 840, which is an example of the software application 208 of the apparatus 202. The illustration tool 840, and/or another portion of the apparatus 510, includes a first content generator (e.g., first content generator 212) that generates first content 830. The first content 830 is an example of the first content 230.

The first content 830 includes a illustration 845 of the illustration tool 840. The illustration 845 is illustrated as including the word "Hi!" drawn using lines. A hand of the user is illustrated touching the touchscreen of the apparatus 510 to draw the illustration 845 using the illustration tool 840 by providing a touch inputs to the apparatus 510 in the shape of the illustration 845 (e.g., spelling out the word "Hi!").

The illustration tool 840, and/or another portion of the apparatus 510, includes a second content generator (e.g., second content generator 214) that generates second content 850. In some examples, the illustration tool 840, and/or another portion of the apparatus 510, includes an image processor for display formatting (e.g., the image processor 216 for display formatting), which may process the second content 850 for display using the display(s) and/or for output using other output device(s) of the head-mounted apparatus 520. The second content 850 can be an example of the second content 232 and/or of the processed second content 234.

The apparatus 510 transmits a transmission 860 from transceiver(s) of the apparatus 510 (e.g., transceiver(s) 224) to transceiver(s) of the head-mounted apparatus 520 (e.g., transceiver(s) 266). The transceiver(s) of the head-mounted apparatus 520 receive the transmission 860 from the transceiver(s) of the apparatus 510. The transmission 860 can be an example of the communication(s) 250. The transmission 860 includes the second content 850. The transmission 860 can be sent and received as discussed with respect to the transmission 560 of FIG. 5, the transmission 660 of FIG. 6, the transmission 760 of FIG. 7, and/or the communication(s) 250 of FIG. 2. In some examples, the head-mounted apparatus 520 can also send information to the apparatus 510, for example requesting the transmission 860 of the second content 850 and/or confirming receipt of at least a portion of the transmission 860 with the second content 850.

The user 505 is able to see a field of view (FOV) 880 of an environment (e.g., real-world, virtual, augmented, and/or mixed) through the display(s) of the head-mounted apparatus 520. In some examples, the display(s) of the head-mounted apparatus 520 display an alternate view 855 of the illustration 845 from the illustration tool 840. The alternate view 855 of the illustration 845 in the second content 850 appears warped, distorted, and/or skewed relative to the depiction of the illustration 845 in the first content 830, specifically appearing horizontally stretched out and/or vertically shortened, for instance to better fit into the environment that the user 505 viewing in the FOV 880. The alternate view 855 of the illustration 845 in the second content 850 also appears to be rotated approximately 30 degrees clockwise about a roll axis that is perpendicular to the planar surface on which FIG. 8 is illustrated, for instance to better fit into the environment that the user 505 viewing in the FOV 880. The illustration 845 may be an element that is present in both the first content 830 and the second content 850. In some examples, the depiction of the illustration 845 in the second content 850 may be more detailed than the depiction of the illustration 845 in the first content 830, for instance in terms of size, resolution, texture resolution, number of polygons, bump mapping fidelity, or a combination thereof.

Figure 9:
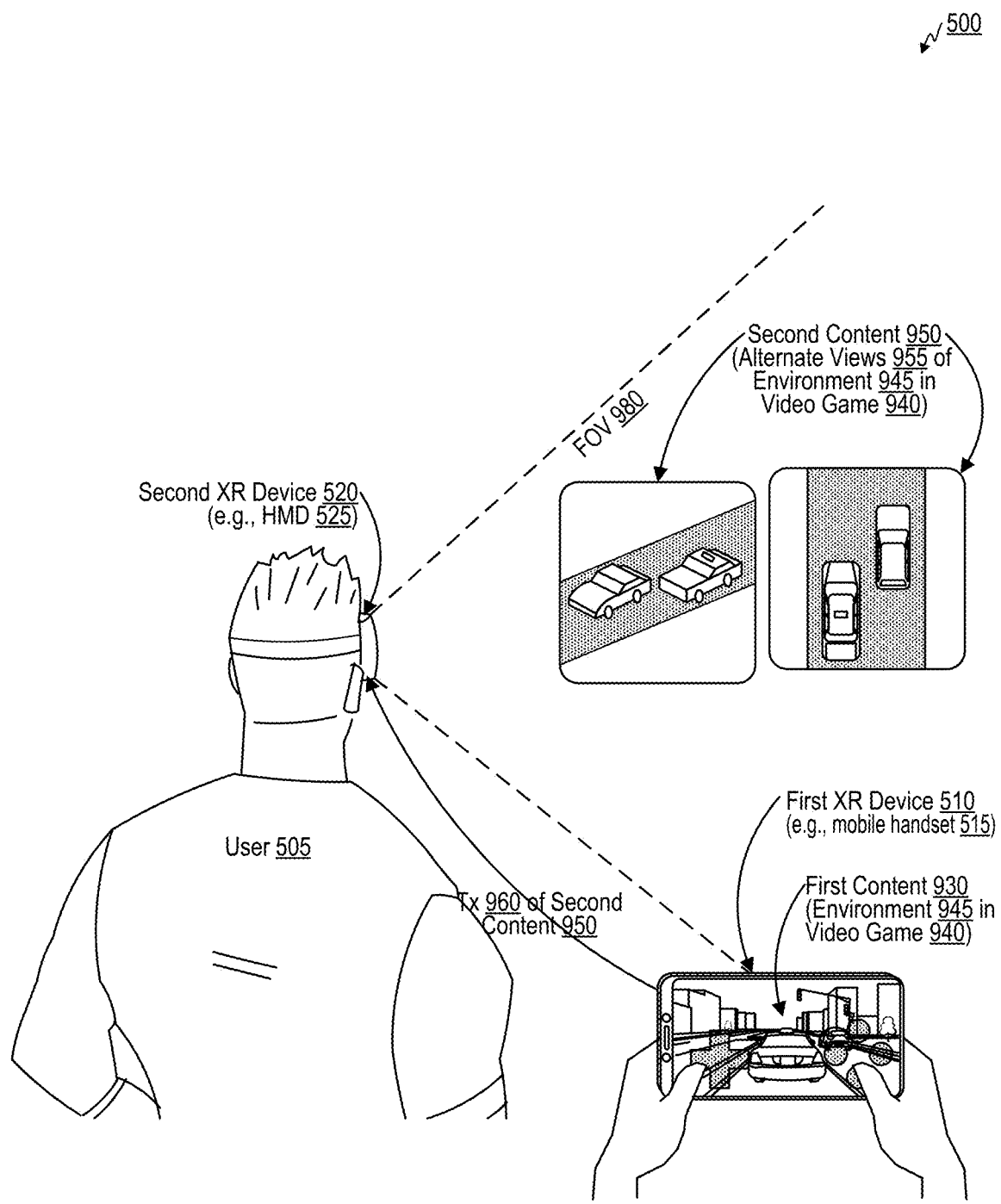
FIG. 9 is a conceptual diagram illustrating the apparatus displaying first content and transmitting second content to the head-mounted apparatus that displays the second content, where the first content and the second content correspond to an environment from a video game involving vehicular racing running on the apparatus, in accordance with some examples.

FIG. 9 is a conceptual diagram 900 illustrating the apparatus 510 displaying first content 930 and transmitting second content 950 to the head-mounted apparatus 520 that displays the second content 950, where the first content 930 and the second content 950 correspond to an environment 945 from a video game 940 involving vehicular racing running on the apparatus 510. The apparatus 510 runs a video game 940, which is an example of the software application 208 of the apparatus 202. The video game 940, and/or another portion of the apparatus 510, includes a first content generator (e.g., first content generator 212) that generates first content 930. The first content 930 is an example of the first content 230.

The first content 930 includes an environment 945 of the video game 940. The environment 945 is illustrated as an environment 945 of a racing game, depicting a view behind the back of a first car in the environment 945, which appears to be a police car. Within the view of the environment 945 in the first content 930, a second car (not a police car) is visible ahead of and to the right of the first car. The first content 930 also includes virtual buttons layered over the view of the environment 945 (e.g., illustrated as shaded in grey), which make certain parts of the environment 945 (including the second car) somewhat difficult to see. Two hands of the user are illustrated touching the touchscreen of the apparatus 510 to press certain virtual buttons. In some examples, these touch inputs control the first car in the environment 945 of the video game 940.

The video game 940, and/or another portion of the apparatus 510, includes a second content generator (e.g., second content generator 214) that generates second content 950. In some examples, the video game 940, and/or another portion of the apparatus 510, includes an image processor for display formatting (e.g., the image processor 216 for display formatting), which may process the second content 950 for display using the display(s) and/or for output using other output device(s) of the head-mounted apparatus 520. The second content 950 can be an example of the second content 232 and/or of the processed second content 234.

The apparatus 510 transmits a transmission 960 from transceiver(s) of the apparatus 510 (e.g., transceiver(s) 224) to transceiver(s) of the head-mounted apparatus 520 (e.g., transceiver(s) 266). The transceiver(s) of the head-mounted apparatus 520 receive the transmission 960 from the transceiver(s) of the apparatus 510. The transmission 960 can be an example of the communication(s) 250. The transmission 960 includes the second content 950. The transmission 960 can be sent and received as discussed with respect to the transmission 560 of FIG. 5, the transmission 660 of FIG. 6, the transmission 760 of FIG. 7, the transmission 860 of FIG. 8, and/or the communication(s) 250 of FIG. 2. In some examples, the head-mounted apparatus 520 can also send information to the apparatus 510, for example requesting the transmission 960 of the second content 950 and/or confirming receipt of at least a portion of the transmission 960 with the second content 950.

The user 505 is able to see a field of view (FOV) 980 of an environment (e.g., real-world, virtual, augmented, and/or mixed) through the display(s) of the head-mounted apparatus 520. In some examples, the display(s) of the head-mounted apparatus 520 display alternate views 955 of the environment 945 from the video game 940. The alternate views 955 of the environment 945 in the second content 950 include a first alternate view illustrated on the right-hand side of the FOV 980. The first alternate view is illustrated as a top-down birds-eye view of the road in the environment 945, with the first car and the second car clearly illustrated, and with the second car visible ahead of and to the right of the first car. The alternate views 955 of the environment 945 in the second content 950 include a second alternate view illustrated on the left-hand side of the FOV 980. The second alternate view is illustrated as a perspective view of the road in the environment 945 from a perspective in front of both cars and to the left of both cars. The first car and the second car are clearly illustrated in the second alternate view, and the second car is visible ahead of and to the right of the first car. At least portions of the environment 945, such as the road and the two cars, may be element(s) that are present in both the first content 930 and the second content 950. In some examples, the depiction of the environment 945 in the second content 950 may include elements of the environment 945 that are missing in the first content 930, for instance by depicting portions of the environment behind the first car.

Figure 10:
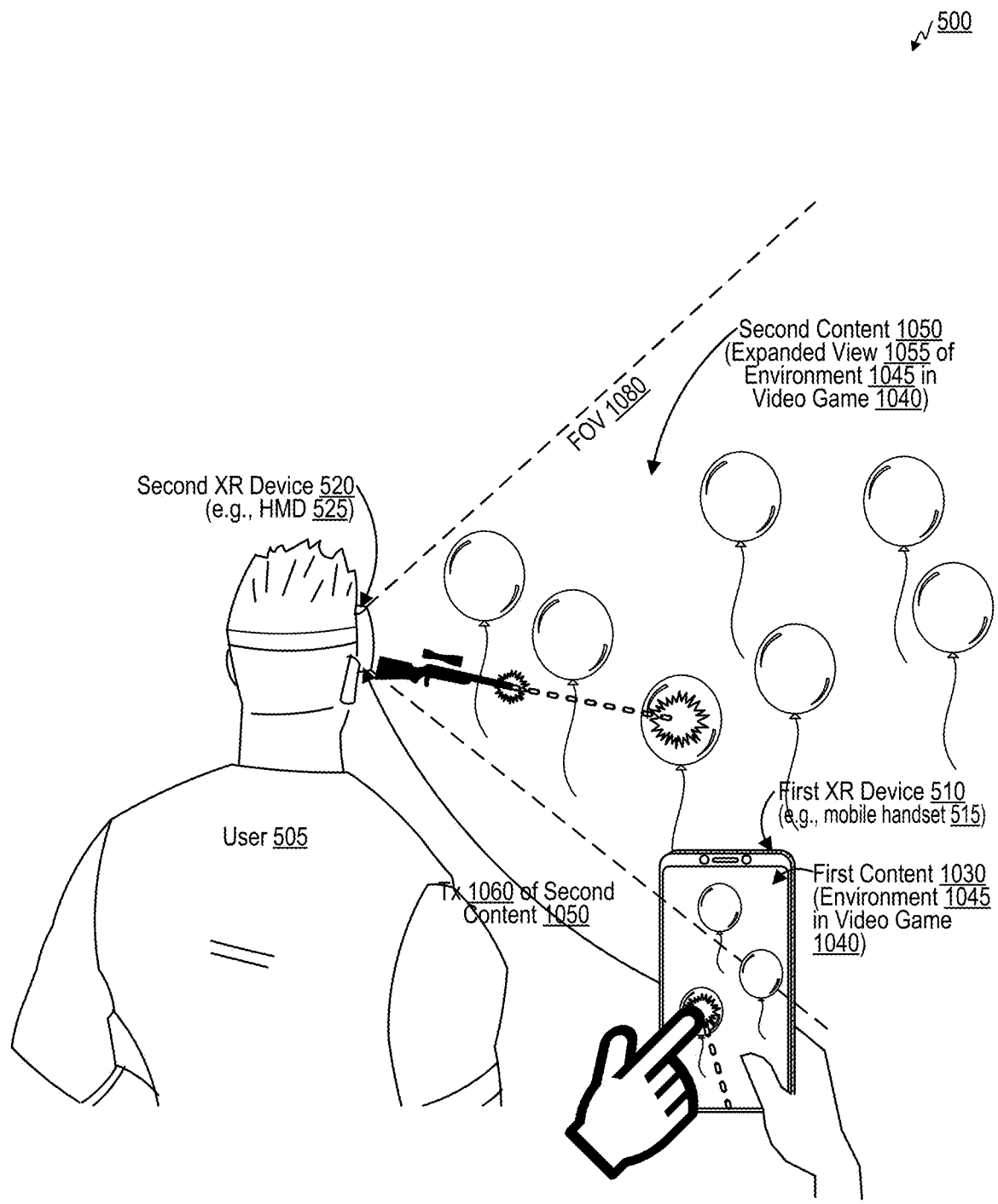
FIG. 10 is a conceptual diagram illustrating the apparatus displaying first content and transmitting second content to the head-mounted apparatus that displays the second content, where the first content and the second content correspond to an environment from a video game involving shooting balloons running on the apparatus, in accordance with some examples.

FIG. 10 is a conceptual diagram 1000 illustrating the apparatus 510 displaying first content 1030 and transmitting second content 1050 to the head-mounted apparatus 520 that displays the second content 1050, where the first content 1030 and the second content 1050 correspond to an environment 1045 from a video game 1040 involving shooting balloons running on the apparatus 510. The apparatus 510 runs a video game 1040, which is an example of the software application 208 of the apparatus 202. The video game 1040, and/or another portion of the apparatus 510, includes a first content generator (e.g., first content generator 212) that generates first content 1030. The first content 1030 is an example of the first content 230.

The first content 1030 includes an environment 1045 of the video game 1040. The environment 1045 is illustrated as an environment 1045 of a balloon shooting game. The environment 1045 is illustrated as including three balloons in the first content 1030—a first balloon, a second balloon below the first balloon, and a third balloon below the second balloon. A hand of the user are illustrated touching the touchscreen of the apparatus 510 to indicate to the third balloon of the balloons in the environment 1045 by providing a touch input to the apparatus 510 at a location of the touchscreen at which a representation of the third balloon is displayed in the environment 1045 as depicted in the first content 1030. A stream of fire is shown firing at the third balloon in the environment 1045, hitting the third balloon and producing an explosion at the position of the third balloon in the environment 1045.

The video game 1040, and/or another portion of the apparatus 510, includes a second content generator (e.g., second content generator 214) that generates second content 1050. In some examples, the video game 1040, and/or another portion of the apparatus 510, includes an image processor for display formatting (e.g., the image processor 216 for display formatting), which may process the second content 1050 for display using the display(s) and/or for output using other output device(s) of the head-mounted apparatus 520. The second content 1050 can be an example of the second content 232 and/or of the processed second content 234.

The apparatus 510 transmits a transmission 1060 from transceiver(s) of the apparatus 510 (e.g., transceiver(s) 224) to transceiver(s) of the head-mounted apparatus 520 (e.g., transceiver(s) 266). The transceiver(s) of the head-mounted apparatus 520 receive the transmission 1060 from the transceiver(s) of the apparatus 510. The transmission 1060 can be an example of the communication(s) 250. The transmission 1060 includes the second content 1050. The transmission 1060 can be sent and received as discussed with respect to the transmission 560 of FIG. 5, the transmission 660 of FIG. 6, the transmission 760 of FIG. 7, the transmission 860 of FIG. 8, the transmission 960 of FIG. 9, and/or the communication(s) 250 of FIG. 2. In some examples, the head-mounted apparatus 520 can also send information to the apparatus 510, for example requesting the transmission 1060 of the second content 1050 and/or confirming receipt of at least a portion of the transmission 1060 with the second content 1050.

The user 505 is able to see a field of view (FOV) 1080 of an environment (e.g., real-world, virtual, augmented, and/or mixed) through the display(s) of the head-mounted apparatus 520. In some examples, the display(s) of the head-mounted apparatus 520 display an expanded view 1055 of the environment 1045 from the video game 1040. The expanded view 1055 of the environment 1045 in the second content 1050 depicts the portion of the environment 1045 visible in the first content 1030 as well as more of the environment 1045 than was visible in the first content 1030, for example including two more balloons to the left of the three balloons that are visible in the first content 1030 and two more balloons to the right of the three balloons that are visible in the first content 1030. A rifle is visible in the second content 1050, firing the stream of fire that is firing at the third balloon in the environment 1045, hitting the third balloon and producing an explosion at the position of the third balloon in the environment 1045. At least portions of the environment 1045, such as the three balloons, the stream of fire, and the explosion, may be element(s) that are present in both the first content 1030 and the second content 1050.

In some examples, the stream of fire from the rifle in the video game 1040 may be aimed toward the third balloon based on the touch input to the touchscreen of the apparatus 510 indicating the position of the third balloon as discussed above and as illustrated in FIG. 10. In some examples, the stream of fire from the rifle in the video game 1040 may be aimed based on the orientation of the head-mounted apparatus 520. For example, if the head-mounted apparatus 520 is an HMD 525 as illustrated in FIGS. 5-10, the user 505 may turn his or her head while wearing the HMD 525 to aim the fire from the rifle in the video game 1040 toward a point in the FOV 1080 that the user 505's face faces toward, and/or that the front of the head-mounted apparatus 520 faces toward, or a combination thereof. If the head-mounted apparatus 520 is a mobile handset, the user 505 may move his or her hand while holding the head-mounted apparatus 520 to aim the fire from the rifle in the video game 1040 toward a point in the FOV 1080 that the user 505's hand faces toward, and/or that the rear of the head-mounted apparatus 520 faces toward, or a combination thereof.

Figure 11:
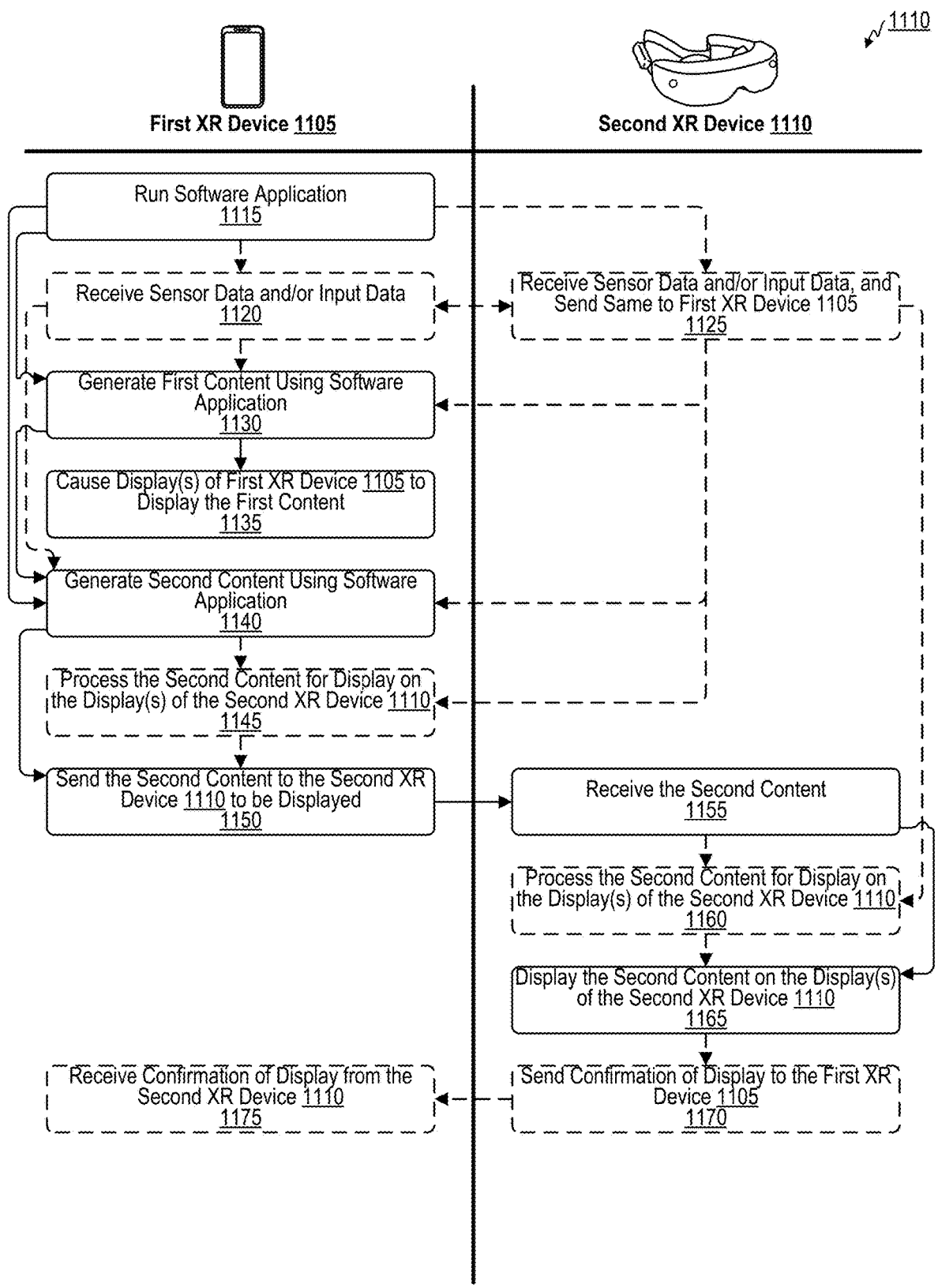
FIG. 11 is a swim lane diagram illustrating a process for interoperability between a apparatus and a head-mounted apparatus, in accordance with some examples.

FIG. 11 is a swim lane diagram illustrating a process 1100 for interoperability between a apparatus 1105 and a head-mounted apparatus 1110. The apparatus 1105 is an example of the apparatus 202 and/or the apparatus 510. The head-mounted apparatus 1110 is an example of the head-mounted apparatus 252 and/or the head-mounted apparatus 520. The apparatus 1105 is illustrated as a mobile handset, such as the mobile handset 410 and/or the mobile handset 515. In some examples (not illustrated), the apparatus 1105 may be a HMD, such as the HMD 310 and/or the HMD 525. The head-mounted apparatus 520 is illustrated as a HMD, such as the HMD 310 and/or the HMD 525. In some examples, the head-mounted apparatus 520 may be a mobile handset, such as the mobile handset 410 and/or the mobile handset 515.

At operation 1115, the apparatus 1105 runs a software application. Examples of the software application of operation 1115 include the software application 208, the recipe app 540, the media asset viewer app 640, the illustration tool 840, the video game 940, the video game 1040, the software application of the process 1200, a browser, another software application described herein, or a combination thereof. Operation 1115 may be followed by operation 1120, operation 1125, operation 1130, and/or operation 1140.

At operation 1120, the apparatus 1105 receives sensor data and/or input data. For example, the sensor data and/or input data of operation 1120 may include sensor data 228 from sensor(s) 218 of the apparatus 1105, input data 228 from input interface(s) 220 of the apparatus 1105, input information from the input interpreter 210 of the apparatus 1105, or a combination thereof. Operation 1120 may be followed by operation 1125, operation 1130, and/or operation 1140.

At operation 1125, the head-mounted apparatus 1110 receives sensor data and/or input data, and sends the same (the sensor data and/or input data) to the apparatus 1105. For example, the sensor data and/or input data of operation 1125 may include sensor data 268 from sensor(s) 260 of the head-mounted apparatus 1110, input data 270 from input interface(s) 262 of the head-mounted apparatus 1110, input information from the input interpreter 257 of the head-mounted apparatus 1110, or a combination thereof.

The head-mounted apparatus 1110 can send the sensor data and/or input data of operation 1125 to the apparatus 1105, and the apparatus 1105 can receive the same, using wired communication(s) and/or wireless communication(s). The head-mounted apparatus 1110 can send the sensor data and/or input data of operation 1125 from transceiver(s) 266 of the head-mounted apparatus 1110 to transceiver(s) 224 of the apparatus 1105. The apparatus 1105 can receive the sensor data and/or input data of operation 1125 at transceiver(s) 224 of the apparatus 1105 from transceiver(s) 266 of the head-mounted apparatus 1110. The head-mounted apparatus 1110 can send the sensor data and/or input data of operation 1125 to the apparatus 1105, and the apparatus 1105 can receive the sensor data and/or input data of operation 1125, using communication(s) 250. Operation 1125 may be followed by operation 1120, operation 1130, operation 1140, operation 1145, and/or operation 1160.

At operation 1130, the apparatus 1105 generates first content using the software application. For instance, apparatus 1105 can generate the first content using a first content generator 212. Examples of the first content of operation 1130 include the first content 230, the first content 530, the first content 630, the first content 830, the first content 930, the first content 1030, the first content of the process 1200, or some combination thereof. In some examples, the apparatus 1105 can generate the first content at operation 1130 based on the sensor data and/or input data received from the apparatus 1105 in operation 1120, based on the sensor data and/or input data received from the head-mounted apparatus 1110 in operation 1125, or a combination thereof. Operation 1130 may be followed by operation 1135 and/or operation 1140.

At operation 1135, the apparatus 1105 causes display(s) of the apparatus 1105 to display the first content. The display(s) of the apparatus 1105 of operation 1135 can be examples of the output device(s) 222 of the apparatus 1105. In some examples, the apparatus 1105 causes the display(s) of the apparatus 1105 to display the first content by storing the first content in a display buffer associated with the display(s) of the apparatus 1105. In some examples, the first content includes other types of media other than visual media, instead of or in addition to visual media, and the apparatus 1105 causes output device(s) of the apparatus 1105 to output the first content at operation 1135. Operation 1135 may be followed by any of operations 1140-1175. Operation 1135 may be preceded by any of operations 1140-1175. Operation 1135 may occur contemporaneously with any of operations 1140-1175.

At operation 1140, the apparatus 1105 generates second content using the software application. For instance, apparatus 1105 can generate the second content using a second content generator 214. Examples of the second content of operation 1140 include the second content 232, the second content 550, the second content 650, the second content 850, the second content 950, the second content 1050, the second content of the process 1200, or some combination thereof. In some examples, the apparatus 1105 can generate the second content at operation 1150 based on the sensor data and/or input data received from the apparatus 1105 in operation 1120, based on the sensor data and/or input data received from the head-mounted apparatus 1110 in operation 1125, or a combination thereof. Operation 1140 may be followed by operation 1145 and/or operation 1150.

At operation 1145, the apparatus 1105 processes the second content for display on the display(s) of the head-mounted apparatus 1110, for instance using an image processor 216 for display formatting of the apparatus 1105. The second content, as processed using the processing of operation 1145, can be an example of the processed second content 234. Operation 1145 may be followed by operation 1150.

At operation 1150, the apparatus 1105 sends the second content to the head-mounted apparatus 1110 to be displayed by the display(s) of the head-mounted apparatus 1110. At operation 1155, the head-mounted apparatus 1110 receives the second content from the apparatus 1105. The apparatus 1105 can send the second content to the head-mounted apparatus 1110, and the head-mounted apparatus 1110 can receive the second content, using wired communication(s) and/or wireless communication(s). The apparatus 1105 can send the second content from transceiver(s) 224 of the apparatus 1105 to transceiver(s) 266 of the head-mounted apparatus 1110. The head-mounted apparatus 1110 can receive the second content at transceiver(s) 266 of the head-mounted apparatus 1110 from transceiver(s) 224 of the apparatus 1105. The apparatus 1105 can send the second content to the head-mounted apparatus 1110, and the head-mounted apparatus 1110 can receive the second content, using communication(s) 250, transmission(s) 560, transmission(s) 660, transmission(s) 760, transmission(s) 760, transmission(s) 860, transmission(s) 960, transmission(s) 1060, or a combination thereof. Operation 1150 may be followed by operation 1155. Operation 1155 can be followed by operation 1160 and/or operation 1165.

At operation 1160, the apparatus 1105 processes the second content for display on the display(s) of the head-mounted apparatus 1110, for instance using an image processor 258 for display formatting of the head-mounted apparatus 1110. The second content, as processed using the processing of operation 1145, can be an example of the processed second content 234. Operation 1160 may be followed by operation 1165.

At operation 1165, the head-mounted apparatus 1110 causes display(s) of the head-mounted apparatus 1110 to display the second content. The display(s) of the head-mounted apparatus 1110 of operation 1165 can be examples of the output device(s) 264 of the apparatus 1105. In some examples, the head-mounted apparatus 1110 causes the display(s) of the head-mounted apparatus 1110 to display the second content by storing the second content in a display buffer associated with the display(s) of the head-mounted apparatus 1110. In some examples, the second content includes other types of media other than visual media, instead of or in addition to visual media, and the head-mounted apparatus 1110 causes output device(s) of the head-mounted apparatus 1110 to output the first content at operation 1165. Operation 1165 may be followed by operation 1170.

At operation 1170, the head-mounted apparatus 1110 sends, to the apparatus 1105, a confirmation that the second content was displayed by the display(s) of the head-mounted apparatus 1110. At operation 1175, the apparatus 1105 receives, from the head-mounted apparatus 1110, the confirmation that the second content was displayed by the display(s) of the head-mounted apparatus 1110. The head-mounted apparatus 1110 can send the confirmation to the apparatus 1105, and the apparatus 1105 can receive the confirmation, using wired communication(s) and/or wireless communication(s). The head-mounted apparatus 1110 can send the confirmation from transceiver(s) 266 of the head-mounted apparatus 1110 to transceiver(s) 224 of the apparatus 1105. The apparatus 1105 can receive the confirmation at transceiver(s) 224 of the apparatus 1105 from transceiver(s) 266 of the head-mounted apparatus 1110. The head-mounted apparatus 1110 can send the confirmation to the apparatus 1105, and the apparatus 1105 can receive the confirmation, using communication(s) 250. Operation 1170 may be followed by operation 1175.

Figure 12:
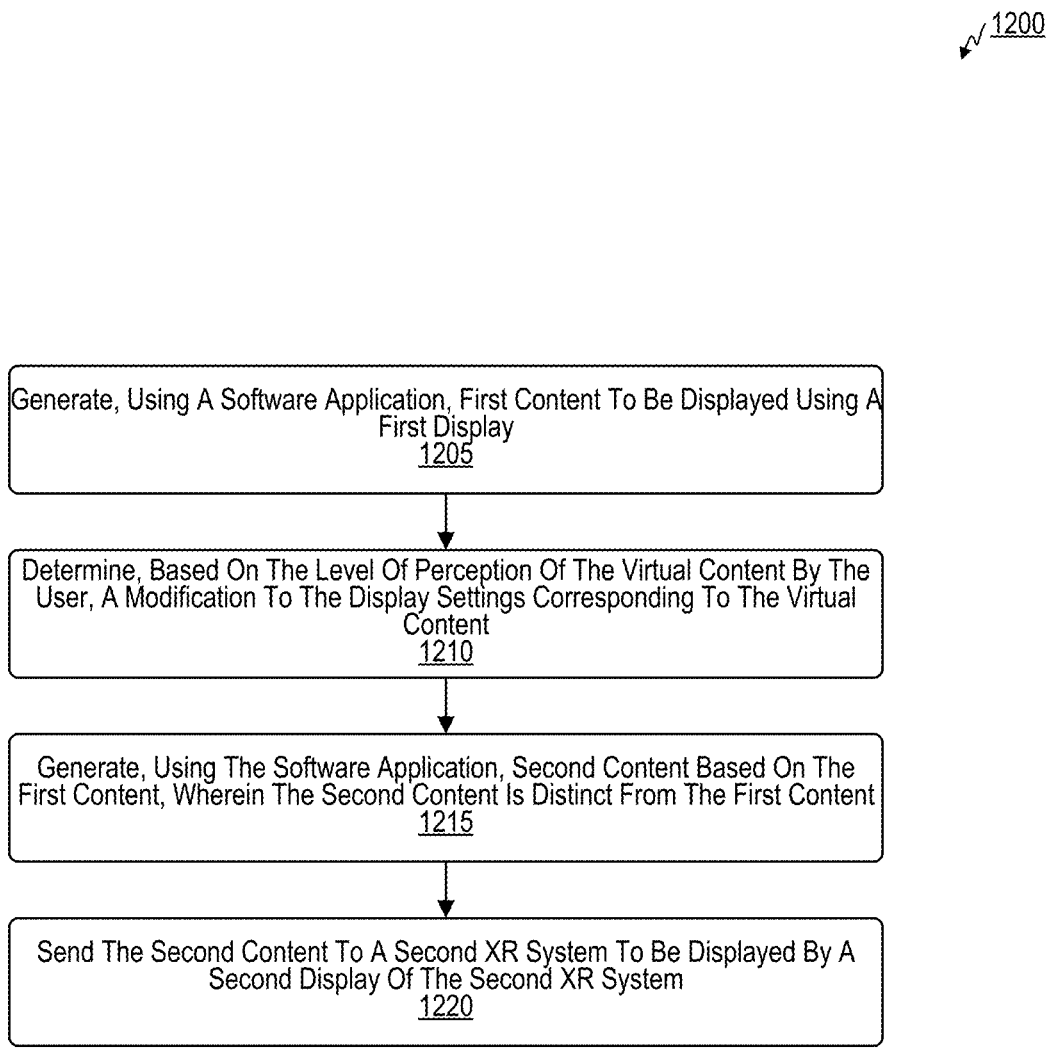
FIG. 12 is a flow diagram illustrating a process for device interoperability for extended reality (XR), in accordance with some examples.

FIG. 12 is a flow diagram illustrating a process 1200 for extended reality (XR) interoperability. The process 1200 may be performed by an XR system. In some examples, the XR system can include, for example, the image capture and processing system 100, the image capture device 105A, the image processing device 105B, the image processor 150, the ISP 154, the host processor 152, the XR system 200, the apparatus 202, the head-mounted apparatus 252, the processor 206, the processor 256, the HMD 310, the mobile handset 410, the apparatus 510, the head-mounted apparatus 520, the apparatus 1105, the head-mounted apparatus 1110, the computing system 1300, the processor 1310, a wireless communication device, a system with a processor reading instructions from a non-transitory computer-readable medium, or a combination thereof.

At operation 1205, the XR system may generate, using a software application of an apparatus, first content to be displayed using a first display of the apparatus. In some examples, operation 1205 may include operation 1115, operation 1120, operation 1125, operation 1130, or a combination thereof. Examples of the apparatus include the image capture and processing system 100, the image capture device 105A, the image processing device 105B, the image processor 150, the ISP 154, the host processor 152, the XR system 200, the apparatus 202, the processor 206, the HMD 310, the mobile handset 410, the apparatus 510, the apparatus 1105, the computing system 1300, the processor 1310, a wireless communication device, a system with a processor reading instructions from a non-transitory computer-readable medium, or a combination thereof.

In some examples, the XR system (e.g., the apparatus) may generate the first content using the first content generator 212. Examples of the software application include the software application 208, the recipe app 540, the media asset viewer app 640, the illustration tool 840, the video game 940, the video game 1040, the software application of the process 1200, a browser, an interactive environment (e.g., a "metaverse"), a communication platform (e.g., for video-conferencing and/or teleconferencing), another software application or software application type described herein, or a combination thereof. Examples of the first content include the first content 230, the first content 530, the first content 630, the first content 830, the first content 930, the first content 1030, the first content generated in operation 1130, or some combination thereof.

In some examples, the XR system (e.g., the apparatus) may receive one or more inputs using an input interface (e.g., of the apparatus and/or of the head-mounted apparatus). To generate the first content at operation 1205, the apparatus may generate the first content based on the one or more inputs. The input interface can include component(s) of the apparatus of the XR system that performs the process 1200, component(s) of the head-mounted apparatus discussed in operation 1220, or a combination thereof. Examples of the input interface include the sensor(s) 218 of the apparatus 202, the input interface(s) 220 of the apparatus 202, the input interpreter 210 of the apparatus 202, the transceiver(s) 225 of the apparatus 202, the sensor(s) 260 of the head-mounted apparatus 252, the input interface(s) 262 of the head-mounted apparatus 252, the input interpreter 257 of the head-mounted apparatus 252, the transceiver(s) 266 of the head-mounted apparatus 252, or a combination thereof. Examples of the one or more inputs include the sensor data 226, the input data 228, the input information output by the input interpreter 210, at least one of the communication(s) 250 received by the transceiver(s) 224, other communication(s) received by the transceiver(s) 224 from another device other than the head-mounted apparatus 252, the sensor data 268, the input data 270, the input information output by the input interpreter 257, at least one of the communication(s) 250 received by the transceiver(s) 266, other communication(s) received by the transceiver(s) 266 from another device other than the apparatus 202, at least one of the communication(s) 250 sent by the transceiver(s) 266, or a combination thereof.

At operation 1210, the XR system may cause the first content to be displayed using the first display of the apparatus. In some examples, operation 1210 may include operation 1130, operation 1135, or a combination thereof. In some examples, the apparatus of the XR system includes the first display that is configured to display the first content. In some examples, the first display is a touchscreen display (e.g., like the display 440 of the mobile handset 410).

Examples of the first display of the apparatus include the output device(s) 222 of the apparatus 202, the output device(s) 264 of the head-mounted apparatus 252, the display(s) 340 of the HMD 310, the display 440 of the mobile handset 410, the display(s) of the apparatus 510, the display(s) of the mobile handset 515, the display(s) of the HMD 525, the display(s) of the apparatus 1005, or a combination thereof. In some examples, operations 1205 and/or 1210 are performed by the apparatus 202 or a variant thereof. In such examples, the first display can be an example of one or more of the output device(s) 222 of the apparatus 202.

In some examples, the apparatus of the XR system includes a display buffer. Causing the first content to be displayed using the first display, as in operation 1210, can include sending the first content to the display buffer of the apparatus to be stored in the display buffer of the apparatus. The XR system (e.g., the apparatus) can then send the first content from the display buffer of the apparatus to the first display of the apparatus to be displayed by the first display of the apparatus.

At operation 1215, the XR system may generate, using the software application of the apparatus, second content. The second content is based on the first content. The second content is distinct from the first content. In some examples, operation 1215 may include operation 1115, operation 1120, operation 1125, operation 1140, operation 1145, or a combination thereof. In some examples, the XR system (e.g., the apparatus) may generate the second content using the first content generator 214. Examples of the second content include the second content 232, the second content 550, the second content 650, the second content 850, the second content 950, the second content 1050, the second content generated in operation 1140, or some combination thereof.

In some examples, the XR system (e.g., the apparatus) may receive one or more inputs using an input interface of the apparatus. To generate the second content at operation 1215, the XR system (e.g., the apparatus) may generate the second content based on the one or more inputs. The input interface can include component(s) of the XR system that performs the process 1200, component(s) of the head-mounted apparatus discussed in operation 1220, or a combination thereof. Examples of the input interface include the sensor(s) 218 of the apparatus 202, the input interface(s) 220 of the first XR system, the input interpreter 210 of the apparatus 202, the transceiver(s) 225 of the apparatus 202, the sensor(s) 260 of the head-mounted apparatus 252, the input interface(s) 262 of the head-mounted apparatus 252, the input interpreter 257 of the head-mounted apparatus 252, the transceiver(s) 266 of the head-mounted apparatus 252, or a combination thereof. Examples of the one or more inputs include the sensor data 226, the input data 228, the input information output by the input interpreter 210, at least one of the communication(s) 250 received by the transceiver(s) 224, other communication(s) received by the transceiver(s) 224 from another device other than the head-mounted apparatus 252, the sensor data 268, the input data 270, the input information output by the input interpreter 257, at least one of the communication(s) 250 received by the transceiver(s) 266, other communication(s) received by the transceiver(s) 266 from another device other than the apparatus 202, at least one of the communication(s) 250 sent by the transceiver(s) 266, or a combination thereof.

In some examples, the first content includes a first view of an element and the second content includes a second view of the shred element. The first view is distinct from the second view. Examples of the element include portions of the recipe 545 (e.g., the images of the chocolate chip cookie and the chocolate bar) in FIG. 5, the selected media asset 656 in FIG. 6, the media assets 657 in FIG. 7, the illustration 845 in FIG. 8, the environment 945 in FIG. 9, the environment 1045 in FIG. 10, or a combination thereof. In some examples, the first content includes a first view of an element represented from a first perspective and the second content includes a second view of the element represented from a second perspective. The first view is distinct from the second view. The first perspective is distinct from the second perspective. Examples of the element include portions of the recipe 545 (e.g., the images of the chocolate chip cookie and the chocolate bar) in FIG. 5, the selected media asset 656 in FIG. 6, the media assets 657 in FIG. 7, the illustration 845 in FIG. 8, the environment 945 in FIG. 9, the environment 1045 in FIG. 10, or a combination thereof. Examples of different views and/or perspectives of an element include the view of the recipe 545 in the first content 530 that differs from the expanded view 555 of the recipe 545 in the second content 550, the media asset viewer interfaces 645 for the media assets 657 in the first content 630 that differs from the alternate view 655 of the selected media asset 656 in the second content 650, the media asset viewer interfaces 645 for the media assets 657 in the first content 630 that differs from the combination 755 of media assets 657 in the second content 750, the view of the illustration 845 in the first content 830 that differs from the alternate view 855 of the illustration 845 in the second content 850, the view of the environment 945 of the video game 940 in the first content 930 that differs from the alternate views 955 of the environment 945 of the video game 940 in the second content 950, and the view of the environment 1045 of the video game 1040 in the first content 1030 that differs from the expanded view 1055 of the environment 1045 of the video game 1040 in the second content 1050.

In some examples, the first content includes a two-dimensional (2D) view of an element and the second content includes a three-dimensional (3D) view of the element. For instance, in FIGS. 6-7, the representations of each of the media assets 657 (including the selected media asset 656) may be 2D in the media asset viewer interface 645 of the first content 630, but 3D in the second content 650 and/or in the second content 750. In FIG. 8, the representation of the illustration 845 may be 2D in the illustration interface of the first content 830, while in the second content 850, the illustration 845 may be mapped to a 3D surface (e.g., simulating projection of the illustration 845 onto the 3D surface) and thus may be a 3D representation of the illustration 845. In FIG. 10, the representations of the balloons may be 2D in the first content 1030, while in the second content 1050, the balloons may appear 3D. In some examples, the first content includes a three-dimensional (3D) view of an element, wherein the second content includes a two-dimensional (2D) view of the element.

At operation 1220, the XR system may cause the second content to be displayed using a second display of a head-mounted apparatus at least in part by sending the second content from the apparatus to the head-mounted apparatus. In some examples, operation 1220 may include operation 1140, operation 1145, operation 1150, operation 1155, operation 1160, operation 1165, operation 1170, operation 1175, or a combination thereof. Examples of the head-mounted apparatus include the head-mounted apparatus 252, the head-mounted apparatus 520, the head-mounted apparatus 1110, or a combination thereof. The head-mounted apparatus can include, for example, the image capture and processing system 100, the image capture device 105A, the image processing device 105B, the image processor 150, the ISP 154, the host processor 152, the XR system 200, the head-mounted apparatus 252, the HMD 310, the mobile handset 410, the head-mounted apparatus 520, the the head-mounted apparatus 1110, the computing system 1300, the processor 1310, a wireless communication device, or a combination thereof.

image capture and processing system 100, the image capture device 105A, the image processing device 105B, the image processor 150, the ISP 154, the host processor 152, the XR system 200, the apparatus 202, the head-mounted apparatus 252, the processor 206, the processor 256, the HMD 310, the mobile handset 410, the apparatus 510, the head-mounted apparatus 520, the apparatus 1105, the head-mounted apparatus 1110, the computing system 1300, the processor 1310, a wireless communication device, a system with a processor reading instructions from a non-transitory computer-readable medium, or a combination thereof.

In some examples, the apparatus and the head-mounted apparatus are both associated with a user. For instance, the apparatus and the head-mounted apparatus can both be in use by the user during a time period during which the XR system performs operation(s) 1205, 1210, 1215, 1220, and/or any other operations described with respect to the process 1200. Examples of the user include a user of the image capture and processing system 100, a user of the XR system 200, a user of the apparatus 202 and the head-mounted apparatus 252, a user of the mobile handset 204 and the head-mounted apparatus 252, a user of the HMD 254, the user 320 of the HMD 310, a user of the mobile handset 410, the user 505 of the apparatus 510 and the head-mounted apparatus 520, the user 505 of the mobile handset 515 and the HMD 525, a user of the apparatus 1105 and the head-mounted apparatus 1110, a user of the computing system 1300, or a combination thereof.

In some examples, the apparatus and the head-mounted apparatus are of different device types, device categories, device form factors, or a combination thereof. For instance, in some examples, the apparatus is a mobile handset (e.g., mobile handset 204, mobile handset 410, mobile handset 515), while the head-mounted apparatus is an HMD (e.g., HMD 254, HMD 310, HMD 525). In some examples, the apparatus and the head-mounted apparatus are used by the user using a different portion of the body of the user. For instance, in some examples, the apparatus is used and/or worn by one or more hands of the user, while the head-mounted apparatus is used and/or worn by the head of the user.

In some examples, the first display of the apparatus and the second display of the head-mounted apparatus are of different display types, display categories, display form factors, or a combination thereof. For instance, in some examples, the second display of the head-mounted apparatus includes one or more light-transmissive displays. The one or more light-transmissive displays may be referred to as one or more optical "see-through" displays. In examples where the second display includes the one or more light-transmissive displays, light from the real-world environment may pass through at least portion(s) of the second display (e.g., which may be transparent, translucent, light-receptive, light-permissive, and/or light-transmissive) to reach the eyes of the user. In some examples, the second content may be displayed as overlaid over at least a portion of the view that the user sees of the environment. In some examples, the first display of the apparatus lacks, and/or does not include, any light-transmissive displays or optical "see-through" displays, and is not light-transmissive (e.g., the first display is light-blocking and/or opaque). In some examples, the opposite is true, in that the first display of the apparatus includes one or more light-transmissive displays and is at least partially light-transmissive, while the second display of the head-mounted apparatus lacks light-transmissive displays and includes displays that are not light-transmissive.

In some examples, the second display of the head-mounted apparatus includes one or more three-dimensional (3D) displays, such as one or more stereoscopic displays. The 3D displays may allow the user to view the second content in three-dimensions, for instance with a perceivable differences in the second content along a depth axis (Z axis) in addition to a height axis (Y axis) and a width axis (X axis). The depth axis (Z axis), height axis (Y axis), and width axis (X axis) are all perpendicular to one another. In some examples, while the second display includes one or more 3D displays, the first display of the apparatus lacks, or does not include, any 3D displays, and is limited to one or more 2D displays. As displayed on the 2D displays, the first content includes perceivable differences only along the height axis (Y axis) and the width axis (X axis). In some examples, the opposite is true, in that the first display of the apparatus includes one or more 3D displays to display the first content in three perceivable dimensions, while the second display of the head-mounted apparatus lacks 3D displays and includes 2D displays to display the second content in two perceivable dimensions.

In some examples, the head-mounted apparatus is a HMD, such as the HMD 310 and/or the HMD 525. In some examples, the head-mounted apparatus is a mobile handset, such as the mobile handset 410 and/or the mobile handset 515. The second content may be sent to the head-mounted apparatus over one or more communications, such as the communication(s) 250, transmission(s) 560, transmission(s) 660, transmission(s) 760, transmission(s) 760, transmission(s) 860, transmission(s) 960, transmission(s) 1060, or a combination thereof.

In some examples, the XR system (e.g., the apparatus) may send the second content to a head-mounted apparatus by sending the second content from transceiver(s) of the XR system to transceiver(s) of the head-mounted apparatus. The XR system may include the transceiver(s) of the XR system. The head-mounted apparatus may include the transceiver(s) of the head-mounted apparatus. Examples of the transceiver(s) of the XR system include the transceiver(s) 224 and/or the communication interface 1340. Examples of the transceiver(s) of the head-mounted apparatus include the transceiver(s) 266 and/or the communication interface 1340.

In some examples, the head-mounted apparatus includes a display buffer. Causing the second content to be displayed using the second display of the head-mounted apparatus, as in operation 1220, can include sending the second content to the display buffer of the head-mounted apparatus to be stored in the display buffer. The head-mounted apparatus can then send the second content from the display buffer to the second display to be displayed by the second display.

In some examples, the XR system (e.g., the apparatus) may receive a first indication of a transition from a decoupled state to a coupled state. In some examples, the XR system (e.g., the apparatus) may receive a second indication of a transition from the coupled state to the decoupled state. The apparatus is coupled (e.g., connected) to the head-mounted apparatus in the coupled state. The apparatus is decoupled (e.g., disconnected) from the head-mounted apparatus in the decoupled state. In some cases, the XR system (e.g., the apparatus) may send the second content from the apparatus to the head-mounted apparatus in response to receiving the first indication of the transition from the decoupled state to the coupled state. For instance, once the apparatus and the head-mounted apparatus become coupled, the apparatus can begin generating the second content (as in operation 1215) and/or begin sending the second content to the head-mounted apparatus (as in operation 1220). In some examples, the transmission of the second content from the apparatus to the head-mounted apparatus can be part of the transition from the decoupled state to the coupled state. The transition from the decoupled state to the coupled state can be initiated based on user interface input, such as a user interface input answering a query to the user as to whether the user would like to enter the coupled state and/or exit the decoupled state. In some examples, the XR system (e.g., the apparatus) may send the second content from the apparatus to the head-mounted apparatus before receiving the second indication of the transition from the coupled state to the decoupled state. For instance, once the apparatus and the head-mounted apparatus become decoupled, the XR system (e.g., the apparatus) can stop generating the second content (as in operation 1215) and/or stop sending the second content to the head-mounted apparatus (as in operation 1220). In some examples, the transmission of the second content from the apparatus to the head-mounted apparatus can be part of the transition from the coupled state to the decoupled state. The transition from the coupled state to the decoupled state can be initiated based on user interface input, such as a user interface input answering a query to the user as to whether the user would like to exit the coupled state and/or enter the decoupled state.

In some examples, the XR system (e.g., the apparatus) may receive a content switch input. In response to receipt of the content switch input, the XR system (e.g., the apparatus) can cause the second content to be displayed using the first display. In response to receipt of the content switch input, the apparatus can stop sending the second content to be head-mounted apparatus. In response to receipt of the content switch input, the XR system (e.g., the apparatus) can cause the head-mounted apparatus to stop displaying the second content. In response to receipt of the content switch input, the XR system (e.g., the apparatus) can send the first content from the apparatus to the head-mounted apparatus to be displayed by the second display of the head-mounted apparatus. In response to receipt of the content switch input, the XR system (e.g., the apparatus) can stop causing the first content to be displayed using the first display of the apparatus. In response to receipt of the content switch input, the XR system (e.g., the apparatus) can cause the first display of the apparatus to stop displaying the first content.

The content switch input can include, for instance, the sensor data 226, the input data 228, the input information output by the input interpreter 210, at least one of the communication(s) 250 received by the transceiver(s) 224, other communication(s) received by the transceiver(s) 224 from another device other than the head-mounted apparatus 252, the sensor data 268, the input data 270, the input information output by the input interpreter 257, at least one of the communication(s) 250 received by the transceiver(s) 266, other communication(s) received by the transceiver(s) 266 from another device other than the apparatus 202, at least one of the communication(s) 250 sent by the transceiver(s) 266, or a combination thereof.

In some examples, the software application is a video game, such as the video game 940 and/or the video game 1040. In some examples, the first content depicts at least a first portion of an environment in the video game and the second content depicts at least a second portion of the environment in the video game. The first portion and the second portion may be distinct and/or different from one another. In some examples, the second content depicts the second portion and at least part of the first portion. In some examples, the first content depicts the first portion and at least part of the second portion. For example, in FIG. 10, only three of the balloons in the environment 1045 are visible in the first content 1030. The first portion of the environment 1045 may include these three balloons. In FIG. 10, seven balloons are visible in the expanded view 1055 of the environment 1045 in the second content 1050. The second portion of the environment 1045 may include the four additional balloons. In this example, the second content 1050 depicts both the first portion and the second portion.

In some examples, the software application is a video game, such as the video game 940 and/or the video game 1040. In some examples, the first content depicts at least a first view of an environment in the video game from a first perspective and the second content depicts at least a second view of the environment in the video game from a second perspective. The first view and the second view may be distinct and/or different from one another. The first perspective and the second perspective may be distinct and/or different from one another. For example, in FIG. 9, the first content 930 depicts a first view of the environment 945 from a first perspective behind the first car, while the second content 950 includes two alternate views 955 (second view(s)) of the environment 945—one from a top-down birds-eye perspective, and the other from an angled perspective from in front of, to the left of, and above the two cars.

In some examples, the software application is a media viewer, such as the media asset viewer app 640. In some examples, the first content depicts at least a first media element viewed using the media viewer, and the second content depicts at least a second media element viewed using the media viewer. The first media element and the second media element may be distinct and/or different from one another. In some examples, the second content depicts the second media element and at least part of the first media element. In some examples, the first content depicts the first media element and at least part of the second media element. For example, in the context of FIG. 6, the second media element can be the selected media asset 656, while the first media element can be a different media asset of the media assets 657 (other than the selected media asset 656). In the context of FIG. 7, the first media element can be a first media asset of the media assets 657, while the second media element can be a second media asset of the media assets 657.

In some examples, the software application is a media viewer, such as the media asset viewer app 640. In some examples, the first content depicts at least a first view of a media element viewed using the media viewer, and the second content depicts at least a second view of the media element viewed using the media viewer. The first view and the second view may be distinct and/or different from one another. An example of the media element is the selected media asset 656, which appears in both the first content 630 and the second content 650 of FIG. 6, but is viewed from a different perspective in the second content 650 than in the first content 630. In the context of FIG. 7, the media element may be, for instance, the star or the octahedron media assets of the media assets 657, which appear rotated differently in the second content 750 compared to the first content 630.

In some examples, the software application is an illustration tool, such as the illustration tool 840. The first content depicts at least a first view of an illustration illustrated using the illustration tool, such as the illustration 845. The second content depicts at least a second view of the illustration illustrated using the illustration tool. The first view and the second view may be distinct and/or different from one another. For example, in FIG. 8, the illustration 845 appears vertically squished, horizontally lengthened, and/or rotated clockwise in the second content 850 compared to the appearance of the illustration 845 in the first content 830.

In some examples, the software application is a media editor. An example of a media editor may include a media viewer (e.g., the media asset viewer app 640) that can edit and/or process the media asset(s), for example by editing image processing properties such as brightness, contrast, color saturation, gain, tint, hue, or some combination thereof. An example of a media editor may include an illustration tool (e.g., the illustration tool 840) that can allow a user to draw over and/or otherwise edit an image or other media asset. In some examples, the first content depicts at least a first view of a media element edited using the media editor, and the second content depicts at least a second view of the media element edited using the media editor.

In some aspects, the imaging system can include: means for generating, using a software application, first content to be displayed using a first display; means for causing the first content to be displayed using the first display; means for generating, using the software application, second content based on the first content, wherein the second content is distinct from the first content; and means for sending the second content to a head-mounted apparatus to be displayed by a second display of the head-mounted apparatus.

In some examples, the means for generating the first content includes the XR system 200, the apparatus 202, the processor 206, the software application 208, the first content generator 212, the HMD 310, the mobile handset 410, the apparatus 510, the mobile handset 515, the HMD 525, the apparatus 1105, the computing system 1300, the processor 1310, or a combination thereof. In some examples, the means for causing the first content to be displayed using the first display includes the apparatus 202, the processor 206, the software application 208, the first content generator 212, the output device(s) 222, the HMD 310, the mobile handset 410, the apparatus 510, the mobile handset 515, the HMD 525, the apparatus 1105, the computing system 1300, the processor 1310, the output device 1335, a media buffer, or a combination thereof. In some examples, the means for generating the second content includes the XR system 200, the apparatus 202, the processor 206, the software application 208, the second content generator 214, the image processor 216 for display formatting, the HMD 310, the mobile handset 410, the apparatus 510, the mobile handset 515, the HMD 525, the apparatus 1105, the computing system 1300, the processor 1310, or a combination thereof. In some examples, the means for sending the second content to the head-mounted apparatus to the displayed by the second display of the head-mounted apparatus includes the XR system 200, the apparatus 202, the processor 206, the software application 208, the second content generator 214, the image processor 216 for display formatting, the transceiver(s) 224, the communication(s) 250, the transceiver(s) 266, the head-mounted apparatus 252, the image processor 258 for display formatting, the output device(s) 264, the HMD 310, the mobile handset 410, the apparatus 510, the head-mounted apparatus 520, the mobile handset 515, the HMD 525, the transmission(s) 560, the transmission(s) 660, the transmission(s) 760, the transmission(s) 760, the transmission(s) 860, the transmission(s) 960, the transmission(s) 1060, the apparatus 1105, the head-mounted apparatus 1110, the computing system 1300, the processor 1310, the output device 1335, the communication interface 1340, or a combination thereof.

Figure 13:
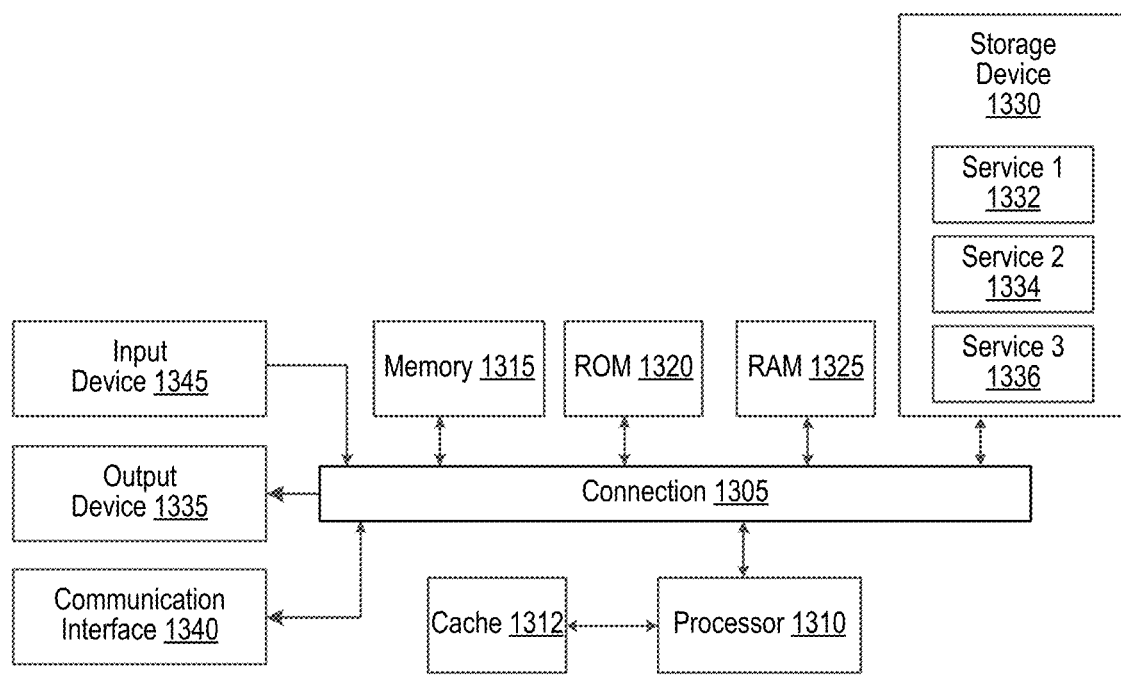
FIG. 13 is a diagram illustrating an example of a computing system for implementing certain aspects described herein.

In some examples, the processes described herein (e.g., process(es) of FIG. 1, process(es) of FIG. 2, process(es) of FIG. 5, process(es) of FIG. 6, process(es) of FIG. 7, process(es) of FIG. 8, process(es) of FIG. 9, process(es) of FIG. 10, process 1100, process 1200, process(es) of FIG. 13, and/or other process described herein) may be performed by a computing device or apparatus. In some examples, the processes of described herein can be performed by the image capture and processing system 100, the image capture device 105A, the image processing device 105B, the image processor 150, the ISP 154, the host processor 152, the XR system 200, the apparatus 202, the head-mounted apparatus 252, the HMD 310, the mobile handset 410, the apparatus 510, the head-mounted apparatus 520, the apparatus 1105, the head-mounted apparatus 1110, the computing system 1300, the processor 1310, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, and/or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus comprising: at least one memory; and one or more processors coupled to the at least one memory, the one or more processors configured to: generate, using a software application, first content to be displayed using a first display of the apparatus; cause the first content to be displayed using the first display of the apparatus; generate, using the software application, second content based on the first content, wherein the second content is distinct from the first content; and cause the second content to be displayed using a second display of a head-mounted apparatus at least in part by sending the second content to the head-mounted apparatus.

Aspect 2. The apparatus of Aspect 1, wherein the first display of the apparatus and the second display of the head-mounted apparatus are of different display types.

Aspect 3. The apparatus of any of Aspects 1 or 2, wherein the second display of the head-mounted apparatus includes at least one of a light-transmissive display or a three-dimensional display.

Aspect 4. The apparatus of any of Aspects 1 to 3, wherein the first content includes a first view of an element represented from a first perspective, wherein the second content includes a second view of the element represented from a second perspective, wherein the first perspective is distinct from the second perspective.

Aspect 5. The apparatus of any of Aspects 1 to 4, wherein the first content includes a two-dimensional (2D) view of an element, wherein the second content includes a three-dimensional (3D) view of the element.

Aspect 6. The apparatus of any of Aspects 1 to 5, wherein the first content includes a three-dimensional (3D) view of an element, wherein the second content includes a two-dimensional (2D) view of the element.

Aspect 7. The apparatus of any of Aspects 1 to 6, wherein the one or more processors are configured to: receive one or more inputs using an input interface, wherein, to generate the first content, the one or more processors are configured to generate the first content based on the one or more inputs.

Aspect 8. The apparatus of any of Aspects 1 to 7, wherein the one or more processors are configured to: receive one or more inputs using an input interface, wherein, to generate the second content, the one or more processors are configured to generate the second content based on the one or more inputs.

Aspect 9. The apparatus of any of Aspects 1 to 8, wherein: the one or more processors are configured to receive an indication of a transition from a decoupled state to a coupled state, wherein the apparatus is coupled to the head-mounted apparatus in the coupled state, wherein the apparatus is decoupled from the head-mounted apparatus in the decoupled state; and to send the second content to the head-mounted apparatus, the one or more processors are configured to send the second content to the head-mounted apparatus in response to receiving the indication.

Aspect 10. The apparatus of any of Aspects 1 to 9, wherein the one or more processors are configured to: receive an indication of a transition from a coupled state to a decoupled state in response to sending the second content to the head-mounted apparatus, wherein the apparatus is coupled to the head-mounted apparatus in the coupled state, wherein the apparatus is decoupled from the head-mounted apparatus in the decoupled state, wherein, to send the second content to the head-mounted apparatus, the one or more processors are configured to send the second content to the head-mounted apparatus before receiving the indication.

Aspect 11. The apparatus of any of Aspects 1 to 10, wherein the one or more processors are configured to: receive a content switch input; cause the second content to be displayed using the first display in response to receipt of the content switch input; and send the first content to the head-mounted apparatus to be displayed by the second display of the head-mounted apparatus in response to receipt of the content switch input.

Aspect 12. The apparatus of any of Aspects 1 to 11, wherein the first content represents a first view of a first media element associated with a software application type of the software application, wherein the second content represents a second view of the first media element or a second media element associated with the software application type of the software application, wherein the software application type includes at least one of a video game, a media viewer, an illustration tool, a media editor, a browser, an interactive environment, or a communication platform.

Aspect 13. The apparatus of any of Aspects 1 to 12, wherein the software application is a video game, wherein the first content depicts at least a first portion of an environment in the video game, and wherein the second content depicts at least a second portion of the environment in the video game.

Aspect 14. The apparatus of any of Aspects 1 to 13, wherein the software application is a video game, wherein the first content depicts at least a first view of an environment in the video game from a first perspective, and wherein the second content depicts at least a second view of the environment in the video game from a second perspective.

Aspect 15. The apparatus of any of Aspects 1 to 14, wherein the software application is a media viewer, wherein the first content depicts at least a first media element viewed using the media viewer, and wherein the second content depicts at least a second media element viewed using the media viewer.

Aspect 16. The apparatus of any of Aspects 1 to 15, wherein the software application is a media viewer, wherein the first content depicts at least a first view of a media element viewed using the media viewer, and wherein the second content depicts at least a second view of the media element viewed using the media viewer.

Aspect 17. The apparatus of any of Aspects 1 to 16, wherein the software application is an illustration tool, wherein the first content depicts at least a first view of an illustration illustrated using the illustration tool, and wherein the second content depicts at least a second view of the illustration illustrated using the illustration tool.

Aspect 18. The apparatus of any of Aspects 1 to 17, wherein the software application is a media editor, wherein the first content depicts at least a first view of a media element edited using the media editor, and wherein the second content depicts at least a second view of the media element edited using the media editor.

Aspect 19. The apparatus of any of Aspects 1 to 18, further comprising: the first display configured to display the first content.

Aspect 20. The apparatus of any of Aspects 1 to 19, wherein the first display is a touchscreen display.

Aspect 21. The apparatus of any of Aspects 1 to 20, wherein the apparatus includes at least one of a mobile handset and a wireless communication device.

Aspect 22. The apparatus of any of Aspects 1 to 21, wherein the head-mounted apparatus includes a head-mounted display.

Aspect 23. The apparatus of any of Aspects 1 to 22, wherein the apparatus and the head-mounted apparatus are both associated with a user and are of different device types.

Aspect 24. A method of device interoperability for extended reality (XR), the method comprising: generating, using a software application of an apparatus, first content to be displayed using a first display of the apparatus; causing the first content to be displayed using the first display of the apparatus; generating, using the software application of the apparatus, second content based on the first content, wherein the second content is distinct from the first content; and causing the second content to be displayed using a second display of a head-mounted apparatus at least in part by sending the second content from the apparatus to the head-mounted apparatus.

Aspect 25. The method of Aspect 24, wherein the first display of the apparatus and the second display of the head-mounted apparatus are of different display types.

Aspect 26. The method of any of Aspects 24 or 25, wherein the second display of the head-mounted apparatus includes at least one of a light-transmissive display or a three-dimensional display.

Aspect 27. The method of any of Aspects 24 to 26, wherein the first content includes a first view of an element, wherein the second content includes a second view of the element, wherein the first view is distinct from the second view.

Aspect 28. The method of any of Aspects 24 to 27, wherein the first content includes a two-dimensional (2D) view of an element, wherein the second content includes a three-dimensional (3D) view of the element.

Aspect 29. The method of any of Aspects 24 to 28, wherein the first content includes a three-dimensional (3D) view of an element, wherein the second content includes a two-dimensional (2D) view of the element.

Aspect 30. The method of any of Aspects 24 to 29, further comprising: receiving one or more inputs using an input interface, wherein generating the first content is based on the one or more inputs.

Aspect 31. The method of any of Aspects 24 to 30, further comprising: receiving one or more inputs using an input interface, wherein generating the second content is based on the one or more inputs.

Aspect 32. The method of any of Aspects 24 to 31, further comprising: receiving an indication of a transition from a decoupled state to a coupled state, wherein the apparatus is coupled to the head-mounted apparatus in the coupled state, wherein the apparatus is decoupled from the head-mounted apparatus in the decoupled state, wherein sending the second content to the head-mounted apparatus is performed in response to receiving the indication.

Aspect 33. The method of any of Aspects 24 to 32, further comprising: receiving an indication of a transition from a coupled state to a decoupled state in response to sending the second content to the head-mounted apparatus, wherein the apparatus is coupled to the head-mounted apparatus in the coupled state, wherein the apparatus is decoupled from the head-mounted apparatus in the decoupled state, wherein sending the second content to the head-mounted apparatus is performed before receiving the indication.

Aspect 34. The method of any of Aspects 24 to 33, further comprising: receiving a content switch input; causing the second content to be displayed using the first display of the apparatus in response to receipt of the content switch input; and sending the first content from the apparatus to the head-mounted apparatus to be displayed by the second display of the head-mounted apparatus in response to receipt of the content switch input.

Aspect 35. The method of any of Aspects 24 to 34, wherein the first content represents a first view of a first media element associated with a software application type of the software application, wherein the second content represents a second view of the first media element or a second media element associated with the software application type of the software application, wherein the software application type includes at least one of a video game, a media viewer, an illustration tool, a media editor, a browser, an interactive environment, or a communication platform.

Aspect 36. The method of any of Aspects 24 to 35, wherein the software application is a video game, wherein the first content depicts at least a first portion of an environment in the video game, and wherein the second content depicts at least a second portion of the environment in the video game.

Aspect 37. The method of any of Aspects 24 to 36, wherein the software application is a video game, wherein the first content depicts at least a first view of an environment in the video game from a first perspective, and wherein the second content depicts at least a second view of the environment in the video game from a second perspective.

Aspect 38. The method of any of Aspects 24 to 37, wherein the software application is a media viewer, wherein the first content depicts at least a first media element viewed using the media viewer, and wherein the second content depicts at least a second media element viewed using the media viewer.

Aspect 39. The method of any of Aspects 24 to 38, wherein the software application is a media viewer, wherein the first content depicts at least a first view of a media element viewed using the media viewer, and wherein the second content depicts at least a second view of the media element viewed using the media viewer.

Aspect 40. The method of any of Aspects 24 to 39, wherein the software application is an illustration tool, wherein the first content depicts at least a first view of an illustration illustrated using the illustration tool, and wherein the second content depicts at least a second view of the illustration illustrated using the illustration tool.

Aspect 41. The method of any of Aspects 24 to 40, wherein the software application is a media editor, wherein the first content depicts at least a first view of a media element edited using the media editor, and wherein the second content depicts at least a second view of the media element edited using the media editor.

Aspect 42. The method of any of Aspects 24 to 41, wherein the method is performed by the apparatus, wherein the apparatus includes the first display configured to display the first content.

Aspect 43. The method of any of Aspects 24 to 42, wherein the first display is a touchscreen display.

Aspect 44. The method of any of Aspects 24 to 43, wherein the apparatus includes at least one of a mobile handset and a wireless communication device.

Aspect 45. The method of any of Aspects 24 to 44, wherein the head-mounted apparatus includes a head-mounted display.

Aspect 46. The method of any of Aspects 24 to 45, wherein the apparatus and the head-mounted apparatus are both associated with a user and are of different device types.

Aspect 47. A non-transitory computer-readable medium of an apparatus having stored thereon instructions that, when executed by one or more processors of the apparatus, cause the one or more processors to perform operations according to any of Aspects 1 to 46.

Aspect 48. An apparatus for device interoperability for extended reality (XR) including one or more means for performing operations according to any of Aspects 1 to 46.

What is claimed is:

1. An apparatus comprising:
at least one memory; and
one or more processors coupled to the at least one memory, the one or more processors configured to:
generate, using a software application, first content to be displayed using a first display of the apparatus;
cause the first content to be displayed using the first display of the apparatus;
generate, using the software application, second content based on the first content, wherein the second content is distinct from the first content; and
send the second content to a head-mounted apparatus to cause the second content to be displayed using a second display of the head-mounted apparatus in response to receipt of an indication of a transition of the apparatus from a decoupled state to a coupled state, wherein the apparatus is configured to be communicatively coupled to the head-mounted apparatus while the apparatus is in the coupled state.

2. The apparatus of claim 1, wherein the apparatus and the head-mounted apparatus are both associated with a user and are of different device types.

3. The apparatus of claim 1, wherein the first display of the apparatus and the second display of the head-mounted apparatus are of different display types.

4. The apparatus of claim 1, wherein the first content includes a first view of an element represented from a first perspective, wherein the second content includes a second view of the element represented from a second perspective, wherein the first perspective is distinct from the second perspective.

5. The apparatus of claim 1, wherein the first content includes a two-dimensional (2D) view of an element, wherein the second content includes a three-dimensional (3D) view of the element.

6. The apparatus of claim 1, wherein the first content includes a three-dimensional (3D) view of an element, wherein the second content includes a two-dimensional (2D) view of the element.

7. The apparatus of claim 1, wherein the one or more processors are configured to:
receive one or more inputs using an input interface, wherein, to generate the first content, the one or more processors are configured to generate the first content based on the one or more inputs.

8. The apparatus of claim 1, wherein the one or more processors are configured to:
receive one or more inputs using an input interface, wherein, to generate the second content, the one or more processors are configured to generate the second content based on the one or more inputs.

9. The apparatus of claim 1, wherein the one or more processors are configured to:
receive the indication.

10. The apparatus of claim 1, wherein the one or more processors are configured to:
receive second indication of a second transition from the coupled state to the decoupled state after sending the second content to the head-mounted apparatus, and wherein the one or more processors are configured to terminate sending of the second content to the head-mounted apparatus in response to receiving the second indication.

11. The apparatus of claim 1, wherein the one or more processors are configured to:
receive a content switch input;
cause the second content to be displayed using the first display in response to receipt of the content switch input; and
send the first content to the head-mounted apparatus to be displayed by the second display of the head-mounted apparatus in response to receipt of the content switch input.

12. The apparatus of claim 1, wherein the first content represents a first view of a first media element associated with a software application type of the software application, wherein the second content represents a second view of the first media element or a second media element associated with the software application type of the software application, wherein the software application type includes at least one of a video game, a media viewer, an illustration tool, a media editor, a browser, an interactive environment, or a communication platform.

13. The apparatus of claim 1, further comprising:
the first display configured to display the first content.

14. The apparatus of claim 1, wherein the first display is a touchscreen display.

15. The apparatus of claim 1, wherein the apparatus includes at least one of a mobile handset and a wireless communication device.

16. The apparatus of claim 1, wherein the apparatus is configured to be communicatively coupled to the head-mounted apparatus using a wireless communication interface while the apparatus is in the coupled state.

17. The apparatus of claim 1, wherein the apparatus is configured to be communicatively coupled to the head-mounted apparatus using a wired communication interface while the apparatus is in the coupled state.

18. A method of device interoperability for extended reality (XR), the method comprising:
generating, using a software application of an apparatus, first content to be displayed using a first display of the apparatus;
causing the first content to be displayed using the first display of the apparatus;
generating, using the software application of the apparatus, second content based on the first content, wherein the second content is distinct from the first content; and
sending the second content to a head-mounted apparatus to cause the second content to be displayed using a second display of the head-mounted apparatus in response to receipt of an indication of a transition of the apparatus from a decoupled state to a coupled state, wherein the apparatus is configured to be communicatively coupled to the head-mounted apparatus while the apparatus is in the coupled state.

19. The method of claim 18, wherein the apparatus and the head-mounted apparatus are both associated with a user and are of different device types.

20. The method of claim 18, wherein the first display of the apparatus and the second display of the head-mounted apparatus are of different display types.

21. The method of claim 18, wherein the first content includes a first view of an element, wherein the second content includes a second view of the element, wherein the first view is distinct from the second view.

22. The method of claim 18, wherein the first content includes a two-dimensional (2D) view of an element, wherein the second content includes a three-dimensional (3D) view of the element.

23. The method of claim 18, wherein the first content includes a three-dimensional (3D) view of an element, wherein the second content includes a two-dimensional (2D) view of the element.

24. The method of claim 18, further comprising:
receiving one or more inputs using an input interface, wherein generating the first content is based on the one or more inputs.

25. The method of claim 18, further comprising:
receiving one or more inputs using an input interface, wherein generating the second content is based on the one or more inputs.

26. The method of claim 18, further comprising:
receiving the indication.

27. The method of claim 18, further comprising:
receiving second indication of a second transition from the coupled state to the decoupled state after sending the second content to the head-mounted apparatus, wherein sending the second content to the head-mounted apparatus terminates in response to receiving the second indication.

28. The method of claim 18, further comprising:
receiving a content switch input;
causing the second content to be displayed using the first display of the apparatus in response to receipt of the content switch input; and
sending the first content from the apparatus to the head-mounted apparatus to be displayed by the second display of the head-mounted apparatus in response to receipt of the content switch input.

29. The method of claim 18, wherein the first content represents a first view of a first media element associated with a software application type of the software application, wherein the second content represents a second view of the first media element or a second media element associated with the software application type of the software application, wherein the software application type includes at least one of a video game, a media viewer, an illustration tool, a media editor, a browser, an interactive environment, or a communication platform.

30. The method of claim 18, wherein the method is performed by the apparatus, wherein the apparatus includes the first display configured to display the first content.

\* \* \* \* \*